United States Patent
Masada et al.

(10) Patent No.: US 7,619,208 B2
(45) Date of Patent: Nov. 17, 2009

(54) PHOTOELECTRIC ENCODER, SCALE AND METHOD OF MANUFACTURING SCALE

(75) Inventors: Norio Masada, Utsunomiya (JP); Yukinari Nozawa, Mooka (JP); Toru Yaku, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/976,542

(22) Filed: Oct. 25, 2007

(65) Prior Publication Data

US 2008/0099666 A1      May 1, 2008

(30) Foreign Application Priority Data

Oct. 27, 2006  (JP)  ............................. 2006-291943
Oct. 23, 2007  (JP)  ............................. 2007-275077

(51) Int. Cl.
    *G01D 5/34*  (2006.01)
(52) U.S. Cl. .................................. 250/231.13; 341/13
(58) Field of Classification Search ............ 250/231.13, 250/231.14; 341/13, 14
    See application file for complete search history.

(56) References Cited

U.S. PATENT DOCUMENTS

| 4,774,494 A | | 9/1988 | Extance et al. |
| 5,216,245 A | * | 6/1993 | Keegan et al. ......... 250/227.23 |

FOREIGN PATENT DOCUMENTS

| EP | 0 498 904 A1 | 8/1992 |
| JP | A-10-163549 | 6/1998 |
| WO | WO 2006/109020 A1 | 10/2006 |

* cited by examiner

*Primary Examiner*—Georgia Y Epps
*Assistant Examiner*—Kevin Wyatt
(74) *Attorney, Agent, or Firm*—Oliff & Berridge PLC

(57) ABSTRACT

A photoelectric encoder includes: a scale having a grating formed thereon along a measuring axis; a light source operative to emit light to the scale so as to form a light spot on the grating; and a photoreceiver operative to receive reflected light from the scale. The light source and the photoreceiver are disposed so as to be allowed to move relative to the scale at least in a direction along the measuring axis. The light source emits the light to the scale so that the photoreceiver receives the reflected light by the scale. The light source emits light with different wavelengths. The scale includes a plurality of reflection portions that respectively reflect the light with different wavelengths.

9 Claims, 17 Drawing Sheets

PHOTOELECTRIC ENCODER, SCALE AND METHOD OF MANUFACTURING SCALE

CROSS-REFERENCE TO RELATED APPLICATIONS

This application is based upon and claims the benefit of priorities from Japanese Patent Applications No. 2006-291943, filed on Oct. 27, 2006 and No. 2007-275077, filed on Oct. 23, 2007, the entire contents of which are incorporated herein by reference in their entirety.

BACKGROUND OF THE INVENTION

1. Field of the Invention

The present invention relates to a photoelectric encoder for use in precise measurement, a scale incorporated in the photoelectric encoder as an element, and a method of manufacturing the scale.

2. Description of the Prior Art

A photoelectric encoder has been utilized in the art for precise measurement of linear displacement, angular displacement and the like. There are many types of photoelectric encoders. For example, it is proposed one type of photoelectric encoder that includes: a photoreceiver in which a plurality of photodiodes are arranged in an array manner; a scale disposed so as to be allowed to move relative to the photoreceiver and in which a reflection type of phase grating is formed; and a light source that emits light to the phase grating (See Japanese Patent Application Publication No. 10-163549, for example). In such a photoelectric encoder, signal light reflected and generated at the phase grating of the scale is received by the photoreceiver so that an amount of displacement such as liner displacement is calculated using an electric signal generated by photoelectric conversion of the signal light.

Since the signal light received by the photoreceiver is generated by the phase grating of the scale, the phase grating is an extremely important element of such a photoelectric encoder. Thus, it is desired means for easily manufacturing a phase grating with high precision.

Although it is thought that the grating of the scale may be formed with high density in order to achieve the phase grating with high precision, there is a problem that the costs of manufacturing the scale with high density are increased.

SUMMARY OF THE INVENTION

It is an object of the present invention to solve the problem described above and to provide a photoelectric encoder with high precision in which the cost of manufacturing the same is reduced to a low cost, a scale incorporated in the photoelectric encoder as an element, and a method of manufacturing the scale of the photoelectric encoder.

In order to achieve the above object, an aspect of the present invention is directed to a photoelectric encoder. The photoelectric encoder of the present invention includes: a scale having a grating formed thereon along a measuring axis; a light source operative to emit light to the scale so as to form a light spot on the grating; and a photoreceiver operative to receive reflected light from the scale. In this case, the light source and the photoreceiver are disposed so as to be allowed to move relative to the scale at least in a direction along the measuring axis, and the light source emits the light to the scale so that the photoreceiver receives the reflected light by the scale. In addition, the light source emits light with different wavelengths, and the scale includes a plurality of reflection portions that respectively reflect the light with different wavelengths.

Since the photoelectric encoder has the configuration described above, the light source emits the light with different wavelengths so that light with one of the different wavelengths is reflected by one of the plurality of reflection portions. Therefore, the amount of information may be increased in accordance with the number of the different wavelengths included in the light reflected by the scale. The increase of the amount of information results in a photoelectric encoder with high precision. Such a photoelectric encoder can be manufactured at a low cost.

It is preferable that the scale includes the plurality of reflection portions respectively having different depths from a surface of the scale so that each of the plurality of reflection portions reflects the light with one of the different wavelengths in accordance with the depth thereof.

It is preferable that the plurality of reflection portions are respectively made of a plurality of color resists, and each of the plurality of color resists reflects or absorbs the light with one of the different wavelengths. Additionally or alternatively, it is preferable that in the plurality of reflection portions, diffraction gratings are respectively formed in incidence planes thereof, and each of the diffraction gratings diffracts light with a predetermined wavelength.

It is preferable that the light source selectively emits light with at least two wavelengths. It is preferable that the photoelectric encoder further includes: a wavelength separator operative to separate the reflected light received by the photoreceiver on the basis of each of the different wavelengths, wherein the light source emits light with a predetermined wavelength range.

Further, according to another aspect of the present invention, the present invention is directed to a scale operative to reflect light emitted by a light source. In this case, the scale is allowed to move relative to the light source and a photoreceiver that are incorporated in a photoelectric encoder. Further, the scale includes a plurality of reflection portions each of which reflects light with one of different wavelengths.

It is preferable that the plurality of reflection portions respectively have different depths from a surface of the scale so that each of the plurality of reflection portions reflects the light with one of the different wavelengths in accordance with the depth thereof.

It is preferable that the plurality of reflection portions are respectively made of a plurality of color resists, and each of the plurality of color resists reflects or absorbs the light with one of the different wavelengths. Additionally or alternatively, it is preferable that in the plurality of reflection portions, diffraction gratings are respectively formed in incidence planes thereof, and each of the diffraction gratings diffracts light with a predetermined wavelength.

Moreover, according to still another aspect of the present invention, the present invention is directed to a method of manufacturing a scale for configuration of a photoelectric encoder. The method of the present invention includes: preparing a substrate; and forming a plurality of reflection portions in a surface of the substrate at predetermined pitch intervals, the plurality of reflection portions respectively reflecting light with different wavelengths. In this case, in the forming the plurality of reflection portions includes forming the plurality of reflection portions respectively having different depths from a surface of the substrate in the surface of the substrate at the predetermined pitch intervals, and one of the plurality of reflection portions reflects light with one of different wavelengths in accordance with the depth thereof.

It is preferable that the plurality of reflection portions are respectively made of a plurality of color resists, and each of the plurality of color resists reflects or absorbs the light with one of different wavelengths.

It is preferable that the forming the plurality of reflection portions includes irradiating lasers respectively having different outputs to the substrate to oxidize the substrate so that each of the plurality of reflection portions has one of the different depths.

It is preferable that the method further includes: after forming the plurality of reflection portions, forming a transparent material on surfaces of the plurality of reflection portions and the surface of the substrate.

According to the present invention, a photoelectric encoder with high precision in which the manufacturing cost is reduced, a scale incorporated in the photoelectric encoder as an element, and a method of manufacturing the scale for the photoelectric encoder can be provided.

BRIEF DESCRIPTION OF THE SEVERAL VIEWS OF THE DRAWINGS

The above and other objects, features and advantages of the present invention will become apparent from the following description of the preferred embodiments in conjunction with the accompanying drawings, wherein.

DETAILED DESCRIPTION OF THE INVENTION

A photoelectric encoder according to preferred embodiments of the present invention will now be described with reference to the accompanying drawings.

FIRST EMBODIMENT

Figure 1:
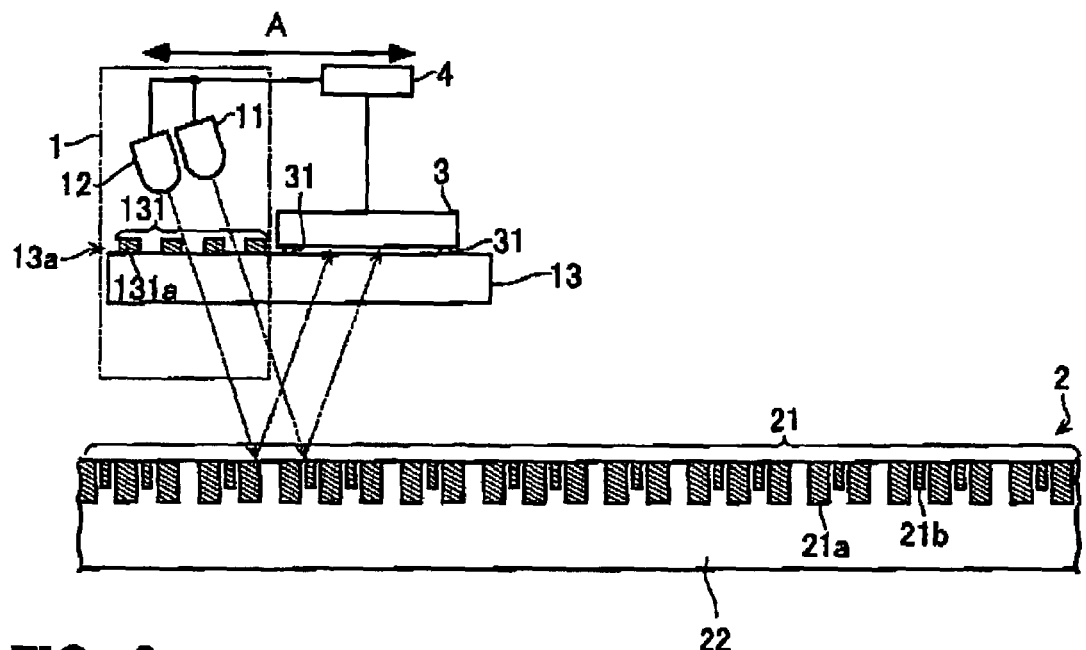
FIG. 1 is a schematic diagram that shows a configuration of a photoelectric encoder according to a first embodiment of the present invention.

A configuration of a photoelectric encoder according to a first embodiment of the present invention will be described. FIG. 1 is a schematic diagram that shows the photoelectric encoder according to the first embodiment of the present invention. As shown in FIG. 1, the photoelectric encoder of the first embodiment is configured from: a light source 1; a scale 2 provided with a phase grating 21 for reflecting light generated by the light source 1; a photoreceiver 3 subjected to the light reflected by the phase grating 21; and a control section 4 for controlling drive of the photoreceiver 3 and for deriving a measurement value from the light received by the photoreceiver 3. The control section 4 also controls On/Off of the light source 1.

The light source 1 includes a red light-emitting diode (LED) 11 and a blue LED 12. For example, the red LED 11 emits light with a center wavelength of 650 nm, while the blue LED 12 emits light with a center wavelength of 388 nm. The light source 1 includes an index scale 13a at a position where the red LED 11 and the blue LED 12 emit light thereto. The index scale 13a is provided on a long transparent substrate 13. An optical grid 131 is formed on a surface the transparent substrate 13, which is opposite to a surface that faces the red LED 11 and the blue LED 12. The optical grid 131 is configured from a plurality of light shield portions 131a that are arranged in a linear manner at predetermined pitch intervals (as one example of an array manner).

Figure 2:
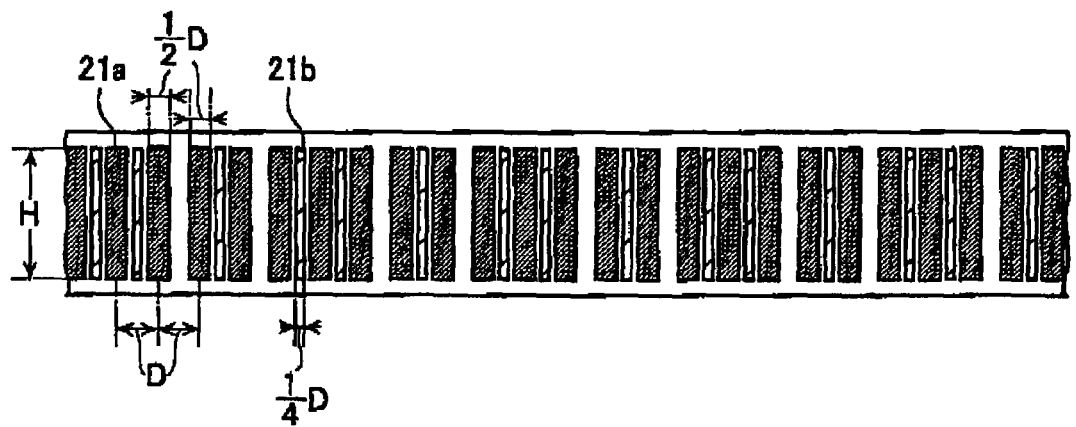
FIG. 2 is a top view of a scale of the photoelectric encoder according to the first embodiment of the present invention.
Figure 3:
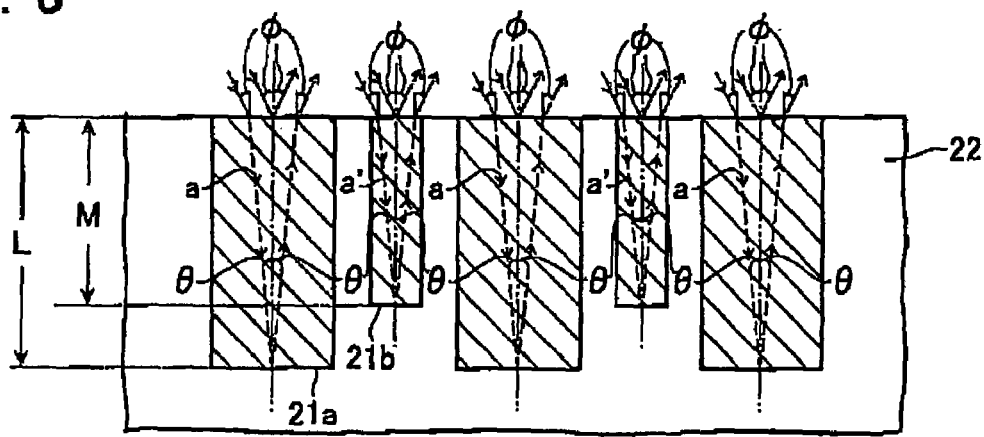
FIG. 3 is an enlarged side cross-sectional view of the scale of the photoelectric encoder according to the first embodiment of the present invention.

The scale 2 is disposed so as to be spaced with a predetermined gap from the surface of the transparent substrate 13 that is opposite to the surface on which the optical grid 131 of the index scale 13a is formed. The scale 2 is formed so as to have a length in a longitudinal direction longer than that of the index scale 13a. A portion of the scale 2 is shown in FIG. 1. FIG. 2 shows a top view of the scale 2. FIG. 3 shows an enlarged side cross-sectional view of a part of the scale. The structure of the scale 2 will be described in detail with reference to FIGS. 1 to 3.

The scale 2 is configured from a long substrate 22 made of a stainless steel material. One surface of the substrate 22 is opposed to the optical grid 131 of the index scale 13a through the transparent substrate 13. The phase grating 21 is formed in the surface of the substrate 22. The light from the light source 1 is emitted to the phase grating 21. The phase grating 21 includes first reflection portions 21a each having a first depth and second reflection portions 21b each having a second depth shallower than the first depth. For example, each of the first reflection portions 21a has a depth L, while each of the second reflection portions 21b has a depth M. Each of the first reflection portions 21a is formed so as to have a width D/2 in a pitch direction and a length H in a direction perpendicular to the pitch direction. The first reflection portions 21a are disposed at predetermined pitch intervals D so as to form an incremental pattern. On the other hand, the second reflection portions 21b are disposed so as to define absolute positional data, such as . . . "1", "1", "0", "1", "0", "1", "1", "0", "1", "0", "1", "1", "0" . . . in the case where it is defined that "1" indicates a state where the second reflection portion 21b is interposed between adjacent two first reflection portions 21a and "0" indicates a state where the second reflection portion 21b is not interposed between adjacent two first reflection portions 21a. Each of the second reflection portions 21b is formed so as to have a width D/4 in the pitch direction and a length H in the direction perpendicular to the pitch direction.

Next, referring again to FIG. 1, the photoreceiver 3 will be described. The photoreceiver 3 is arranged on the surface of the transparent substrate 13 on which the optical grid 131 of the index scale 13a is arranged through bumps 31 made of Au or the like. The photoreceiver 3 is disposed so that a receiving surface thereof faces the phase grating 21. A charge-coupled device (CCD) or a complementary metal-oxide semiconductor (CMOS) may be utilized as the photoreceiver 3, for example.

The photoreceiver 3, the transparent substrate 13 including the index scale 13a, the red LED 11 and the blue LED 12 are accommodated within an enclosure (not shown). The enclosure is allowed to move relative to the scale 2 in a longitudinal direction of the scale 2 ("A" direction shown in FIG. 1). In other words, the scale 2 is allowed to move relative to the enclosure mentioned above in the "A" direction shown in FIG. 1. In this regard, although the photoelectric encoder is of the linear type (one-dimensional type), the present embodiment can be applied to a two-dimensional type of photoelectric encoder.

Next, a difference of optical characteristics between the first reflection portion 21a and the second reflection portion 21b will be described with reference to FIG. 3. As shown in FIG. 3, the light is emitted from the red LED 11 and the blue LED 12 at an angle φ with respect to a perpendicular line to the surface of the substrate 22. The light emitted to the substrate 22 is reflected on the surface of the substrate 22 or a bottom of each of the first reflection portions 21a and each of the second reflection portions 21b. Here, it is assumed that an angle of incidence of the light at the bottom of each of the first reflection portions 21a or the second reflection portions 21b is indicated by "θ", and an index of refraction of each of the first reflection portions 21a and the second reflection portions 21b is indicated by "n" (where n=sin φ/sin θ). There occurs a difference between the light reflected on the surface of the first reflection portion 21a and the light reflected by the bottom of the same first reflection portion 21a by an optical path length "a" as shown in FIG. 3. Likewise, there occurs a difference between the light reflected by the surface of the second reflection portion 21b and the light reflected by the bottom of the same second reflection portion 21b by an optical path length "a'" as shown in FIG. 3. Thus, the relationships between the respective depths of the first reflection portions 21a and the second reflection portions 21b and a wavelength of the light reflected according to the depth meet the following expressions (1) and (2).

$$m\lambda = \frac{2nL}{\sqrt{n^2 - \sin^2\phi}} \quad (1)$$

(where "m" indicates a positive integer.)

$$k\lambda = \frac{2nM}{\sqrt{n^2 - \sin^2\phi}} \quad (2)$$

("k" indicates a iositive integer.)

The first reflection portion 21a meets the relationship of the expression (1). The first reflection portion 21a has the depth L for strengthening and reflecting red light (a wavelength thereof is 650 nm). The second reflection portion 21b meets the relationship of the expression (2). The second reflection portion 21b has the depth M for strengthening and reflecting blue light (a wavelength thereof is 388 nm). Further, the first reflection portion 21a and the second reflection portion 21b have the refractive index "n" that meets requirements of the expressions (1) and (2).

The first reflection portions 21a formed as described above are utilized to measure incremental (INC) data by which an amount of the relative movement of the scale 2 can be calculated on the basis of the number of variation in the amount of reflection light by the first reflection portions 21a at the predetermined pitch intervals. The second reflection portions 21b are utilized to measure absolute position (ABS) data by which an amount of relative movement of the scale 2 can be calculated on the basis of variation in a specific pattern of the amount of reflection light by the second reflection portions 21b.

Figure 4:
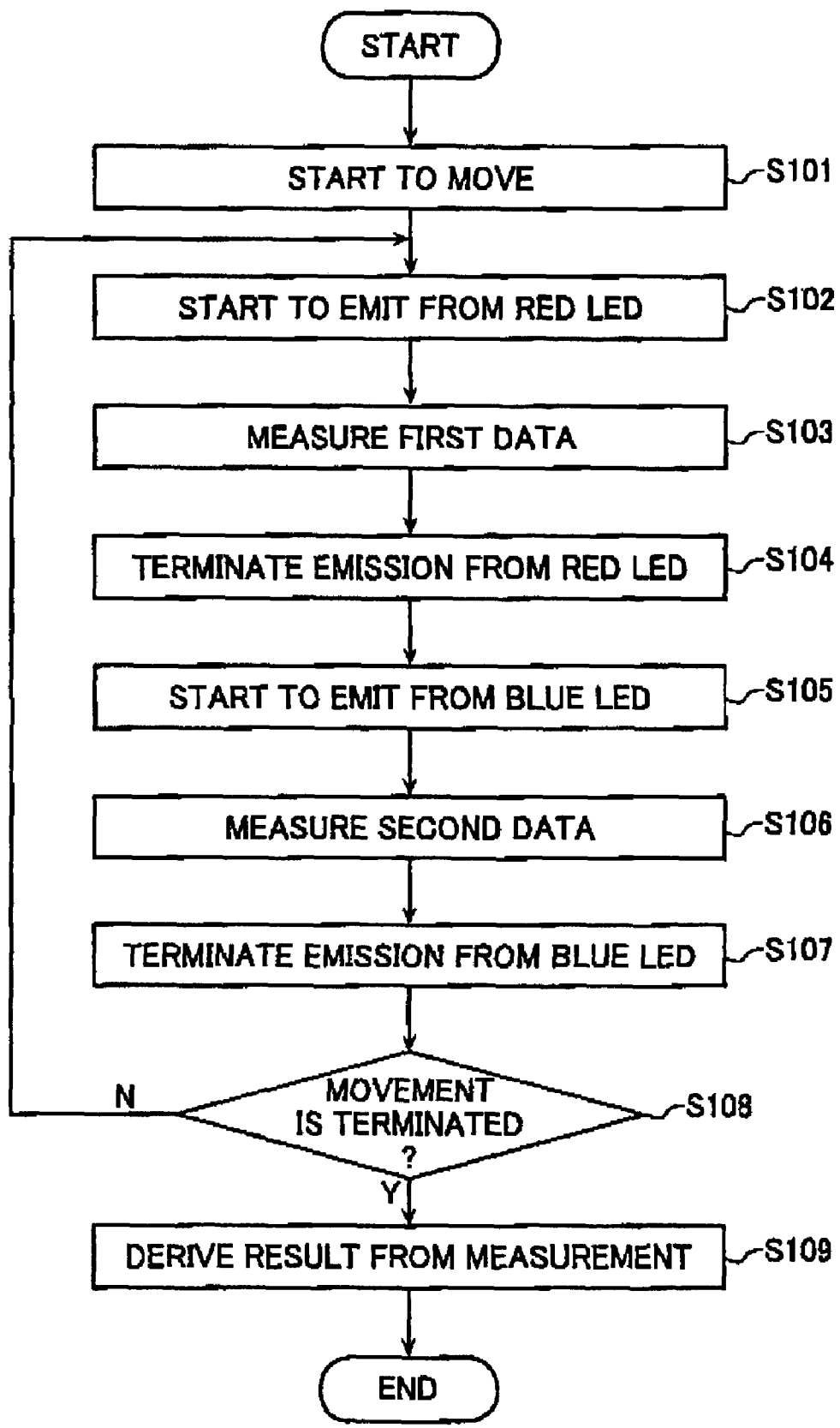
FIG. 4 is a flowchart that shows an operation of the photoelectric encoder according to the first embodiment of the present invention.

Next, a measurement operation of the photoelectric encoder according to the first embodiment will be described with reference to FIG. 4. The control section 4 first causes the scale 2 to relatively move in the direction indicated by the "A" (Step S101). Subsequently, the control section 4 causes the red LED 11 to emit red light (Step S102), and the photoreceiver 3 thereby receives the reflected light. The control section 4 then measures first data (incremental data of equal pitches) on the basis of a reception light signal from the photoreceiver 3 (Step S103). Subsequently, the control section 4 causes the red LED 11 to terminate the emission of the red light (Step S104).

Subsequently, the control section 4 causes the blue LED 12 to emit blue light (Step S105), and the photoreceiver 3 thereby receives the reflected light. The control section 4 then measures second data (absolute position data) on the basis of a reception light signal from the photoreceiver 3 (Step S106). Subsequently, the control section 4 causes the blue LED 12 to terminate the emission of the blue light (Step S107).

The control section 4 then determines whether or not termination of the movement is accepted or whether or not the termination is detected (Step S108). Here, in the case where the control section 4 determines that the movement is terminated ("Yes" at Step S108), the control section 4 derives a result of the measurement from the number of variation of the first data during the movement and the variation pattern of the second data during the movement (Step S109). The operation is then terminated. On the other hand, in the case where the control section 4 determines that the movement is not terminated ("No" at Step S108), the control section 4 repeatedly executes the operations of Steps S102 to S107 again.

By configuring the photoelectric encoder in this manner, two types of light with different wavelengths are emitted from the red LED 11 and the blue LED 12 so that the first reflection portion 21a and the second reflection portion 21b in the scale 2 respectively reflect the two types of light. Therefore, the amount of information includes wavelength information on the red light and the blue light that are reflected in the scale 2. Namely, the amount of information is increased, whereby a photoelectric encoder with high precision can be provided.

SECOND EMBODIMENT

Next, a configuration of a photoelectric encoder according to a second embodiment of the present invention will be described with reference to FIGS. 5 to 7. In this regard, elements identical with those of the first embodiment are assigned to the same reference numerals of the first embodiment, and descriptions thereof are omitted.

Figure 5:
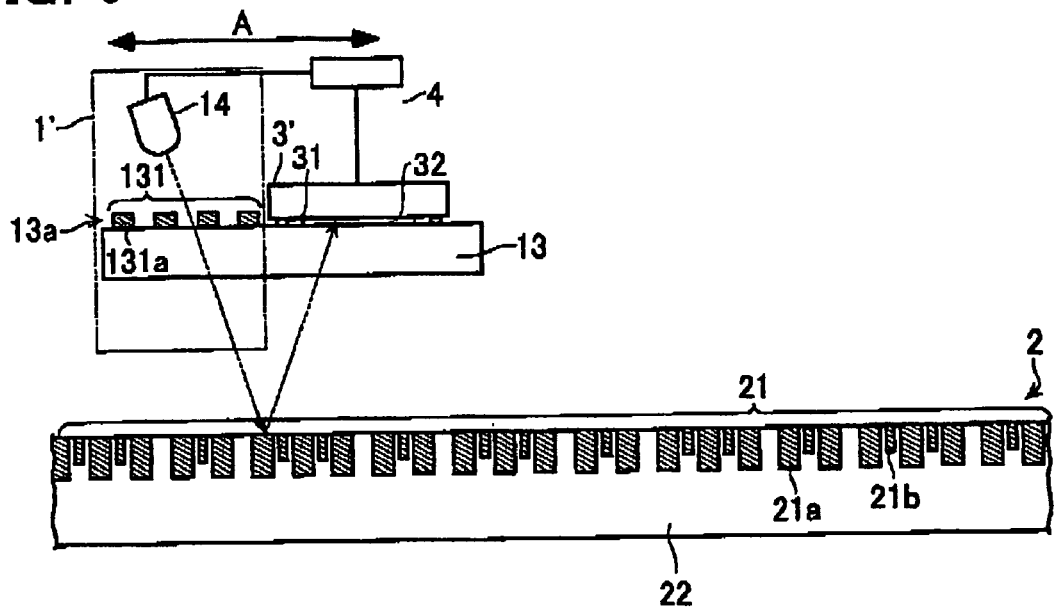
FIG. 5 is a schematic diagram that shows a configuration of a photoelectric encoder according to a second embodiment of the present invention.

As shown in FIG. 5, the photoelectric encoder of the second embodiment includes a scale 2 and a control section 4 that are the same as those of the first embodiment. A light source 1' and a photoreceiver 3' of the photoelectric encoder are different from those of the first embodiment.

The light source 1' of the second embodiment is differentiated from that of the first embodiment so as to include a white LED 14 in place of the read LED 11 and the blue LED 12.

Figure 6:
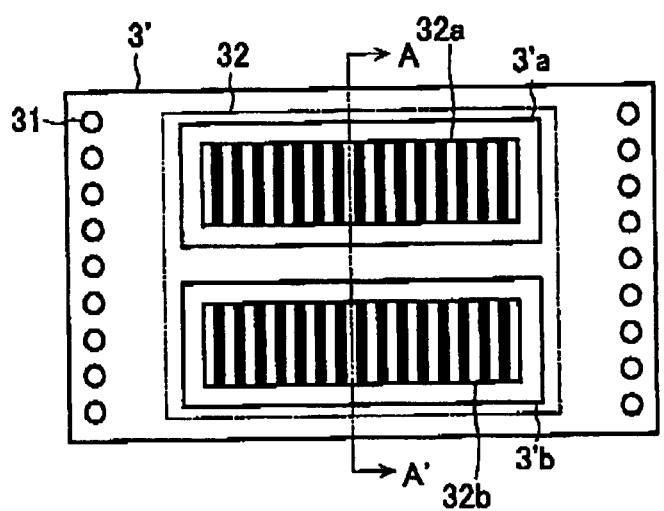
FIG. 6 is a schematic diagram of a photoreceiver of the photoelectric encoder according to the second embodiment of the present invention.
Figure 7:
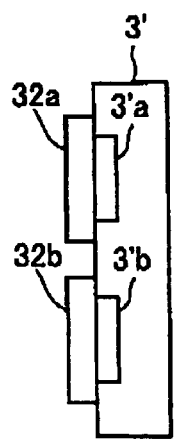
FIG. 7 is a cross-sectional view taken along the line A-A' shown in FIG. 6 that shows the photoreceiver of the photoelectric encoder according to the second embodiment of the present invention.

As shown in FIGS. 5 to 7, the photoreceiver 3' of the second embodiment includes a light filter unit 32 on the surface opposite to a surface to which the reflected light is emitted. The light filter unit 32 allows predetermined light to pass therethrough.

The light filter unit 32 is configured from a red light filter 32a and a blue light filter 32b. The red light filter 32a allows only red light to pass therethrough. The blue light filter allows only blue light to pass therethrough. Further, the photoreceiver 3' includes a red light reception area 3'a for receiving only the red light passed through the red light filter 32a and a blue light reception area 3'b for receiving only the blue light passed through the blue light filter 32b.

Figure 8:
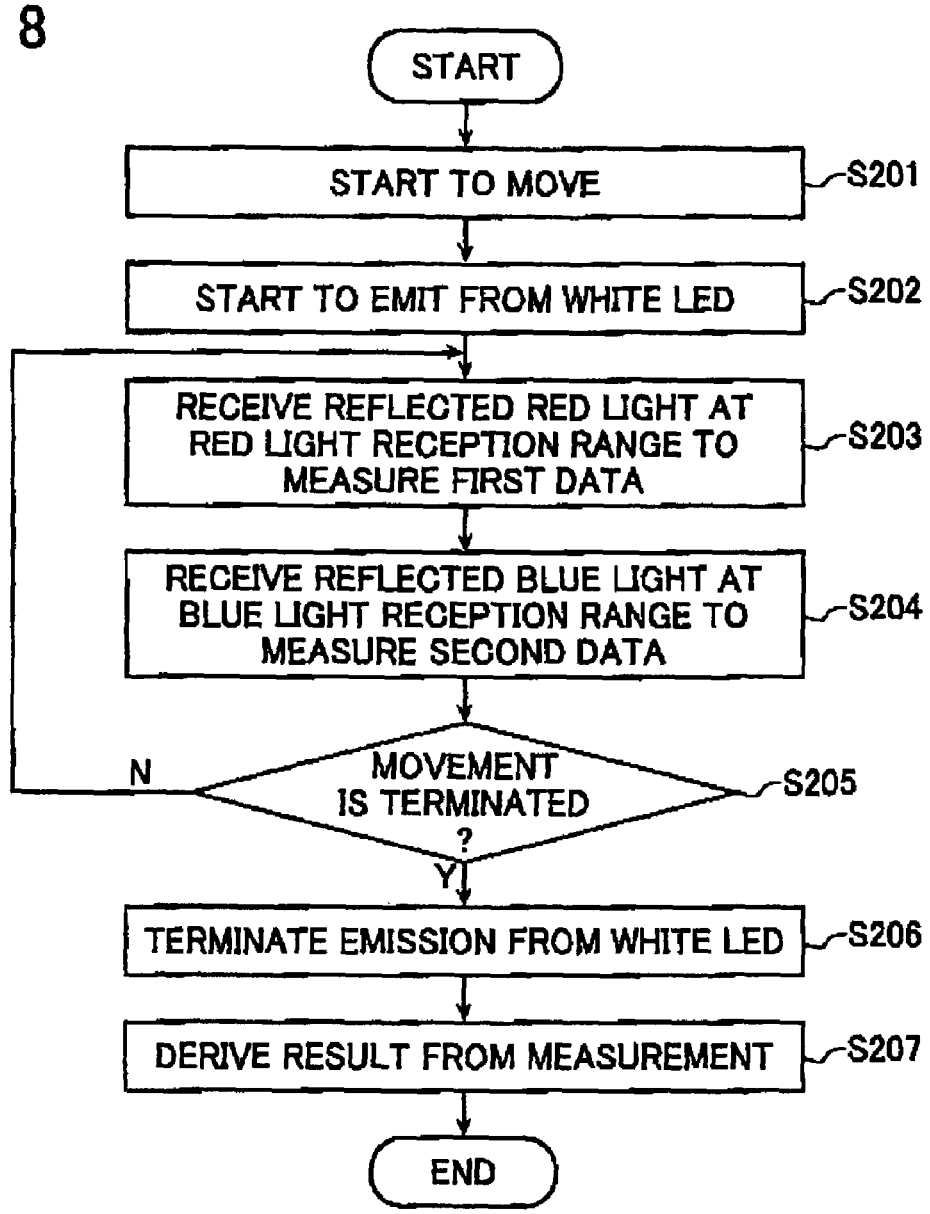
FIG. 8 is a flowchart that shows an operation of the photoelectric encoder according to the second embodiment of the present invention.

Next, a measurement operation of the photoelectric encoder of the second embodiment will be described with reference to FIG. 8. The control section 4 first causes the scale 2 to relatively move in the direction "A" (Step S201). Subsequently, the control section 4 causes the white LED 14 to emit the light (Step S202). Red light of the reflected light passes through the red light filter 32a, and is received on the red light reception area 3' a of the photoreceiver 3'. The control section 4 measures first data (Step S203). Likewise, blue light of the reflected light passes through the blue light filter 32b, and is received on the blue light reception area 3'b of the photoreceiver 3'. The control section 4 measures second data (Step S204).

The control section 4 determines whether or not termination of the movement is accepted or whether or not the termination is detected (Step S205). Here, in the case where the control section 4 determines that the movement is terminated ("Yes" at Step S205), the control section 4 causes the white LED 14 to terminate the emission (Step S206). The control section 4 then derives a result of the measurement from the variation number and the variation pattern against the movement in the measured data (Step S207), and the operation is terminated. On the other hand, in the case where the control section 4 determines that the movement is not terminated ("No" at Step S205), the control section 4 repeatedly executes the operations of Steps S203 and S204 again.

By configuring the photoelectric encoder in this manner, the same effects of the first embodiment can be achieved.

THIRD EMBODIMENT

Figure 9:
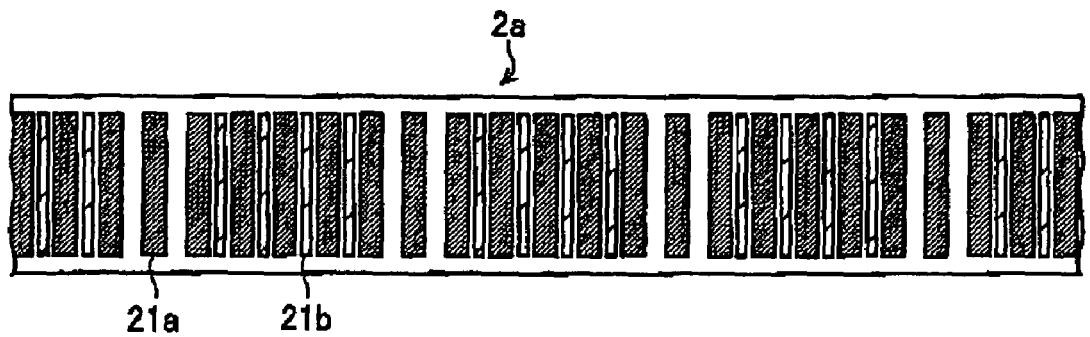
FIG. 9 is a top view of a scale of a photoelectric encoder according to a third embodiment of the present invention.

Next, a photoelectric encoder according to a third embodiment of the present invention will be described with reference to FIG. 9. In this regard, elements identical with those of the first and second embodiments are assigned to the same reference numerals of the first and second embodiments, and descriptions thereof are omitted.

The photoelectric encoder of the third embodiment includes a light source 1, a photoreceiver 3 and a control section 4 that are the same as those of the first embodiment. A scale 2a of the photoelectric encoder is different from that of the first embodiment.

In the scale 2a, arrangement of the second reflection portions 21b relative to the first reflection portions 21a is different from that of the scale 2 of the first embodiment. It is assumed that the second reflection portions 21b are formed in a regular order of . . . "1", "1", "1", "1", "0", "0", "1", "1", "1", "1", "0", "0" . . . in the case where it is defined that "1" indicates a state where the second reflection portion 21b is interposed between adjacent two first reflection portions 21a, and "0" indicates a state where the second reflection portion 21b is not interposed between adjacent two first reflection portions 21a.

By configuring the photoelectric encoder in this manner, the same effects of the first embodiment can be achieved.

FOURTH EMBODIMENT

Figure 10:
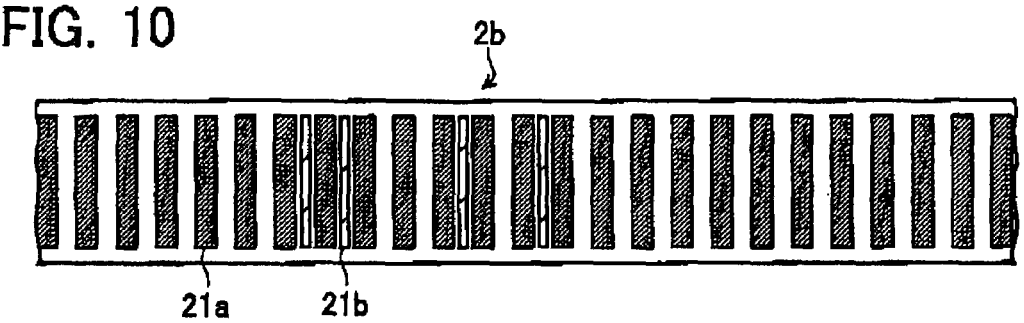
FIG. 10 is a top view of a scale of a photoelectric encoder according to a fourth embodiment of the present invention.

Next, a photoelectric encoder according to a fourth embodiment of the present invention will be described with reference to FIG. 10. In this regard, elements identical with those of the first and second embodiments are assigned to the same reference numerals of the first and second embodiments, and descriptions thereof are omitted.

The photoelectric encoder of the fourth embodiment includes a light source 1, a photoreceiver 3 and a control section 4 that are the sane as those of the first embodiment. A scale 2b of the photoelectric encoder is different from that of the first embodiment.

In the scale 2b, arrangement of the second reflection portions 21b relative to the first reflection portions 21a is different from that of the scale 2 of the first embodiment. It is assumed that the second reflection portions 21b are arranged in a predetermined region in an order of "0" . . . "0", "1", "1", "0", "0", "1", "0", "1", "0" . . . "0" in the case where it is defined that "1" indicates a state where the second reflection portion 21b is interposed between adjacent two first reflection portions 21a, and "0" indicates a state where the second reflection portion 21b is not interposed between adjacent two first reflection portions 21a.

By configuring the photoelectric encoder in this manner, the same effects of the first and second embodiments can be achieved. Further, since the second reflection portions 21b are arranged only in the predetermined region of the scale 2b so as to from a specific pattern as described above, the specific pattern can be utilized in useful for reading out as an origin or the like, for example.

FIFTH EMBODIMENT

Figure 11:
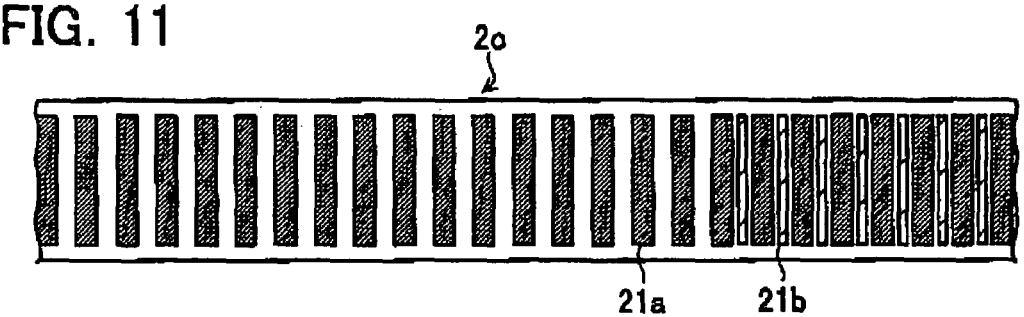
FIG. 11 is a top view of a scale of a photoelectric encoder according to a fifth embodiment of the present invention.

Next, a photoelectric encoder according to a fifth embodiment of the present invention will be described with reference to FIG. 11. In this regard, elements identical with those of the first and second embodiments are assigned to the same reference numerals of the first and second embodiments, and descriptions thereof are omitted.

The photoelectric encoder of the fifth embodiment includes a light source 1, a photoreceiver 3 and a control section 4 that are the same as those of the first embodiment. A scale 2c of the photoelectric encoder is different from that of the first embodiment.

In the scale 2c, arrangement of the second reflection portions 21b relative to the first reflection portions 21a is different from that of the scale 2 of the first embodiment. It is assumed that the second reflection portions 21b are continuously arranged only in a predetermined region in an order of "0" . . . "0", "1", "1", "1", "1", "1", "1", "1", "0" . . . "0" in the case where it is defined that "1" indicates a state where the second reflection portion 21b is interposed between adjacent two first reflection portions 21a, and "0" indicates a state where the second reflection portion 21b is not interposed between adjacent two first reflection portions 21a.

By configuring the photoelectric encoder in this manner, the same effects of the first and second embodiments can be achieved. Further, since the second reflection portions 21b are continuously arranged only in the predetermined region of the scale 2b, the pattern can be utilized in useful for reading out as an origin or the like, for example.

SIXTH EMBODIMENT

Next, a photoelectric encoder according to a sixth embodiment of the present invention will be described with reference to FIGS. 12 to 16. In this regard, elements identical with those of the first and second embodiments are assigned to the same reference numerals of the first and second embodiments, and descriptions thereof are omitted.

The photoelectric encoder of the sixth embodiment includes a light source 1 and a control section 4 that are the same as those of the first embodiment. A scale 2d and a photoreceiver 3" of the photoelectric encoder are different from those of the first embodiment.

Figure 12:
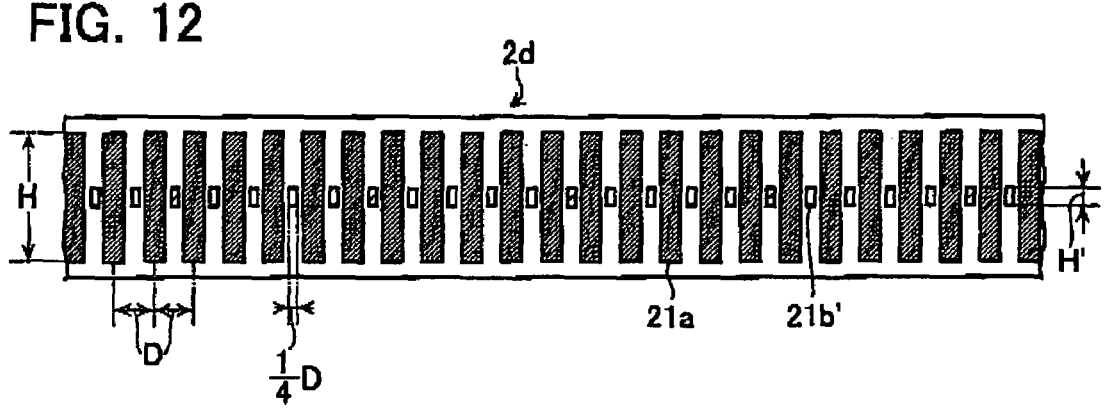
FIG. 12 a top view of a scale of a photoelectric encoder according to a sixth embodiment of the present invention.

In the scale 2d, as shown in FIG. 12, arrangement of the second reflection portions 21b' relative to the first reflection portions 21a and the shape of each second reflection portion 21b' are different from those of the scale 2 of the first embodiment. The first reflection portions 21a and the second reflections portions 21b' are arranged alternately. Namely, each of the second reflection portions 21b' is interposed between the adjacent two first reflection portions 21a so that the second reflection portions 21b' are disposed successively. Further, each of the second reflection portions 21b' is formed so as to have a width of D/4 in the pitch direction and a length of H' (H'<H) in the direction perpendicular to the pitch direction.

Figure 13:
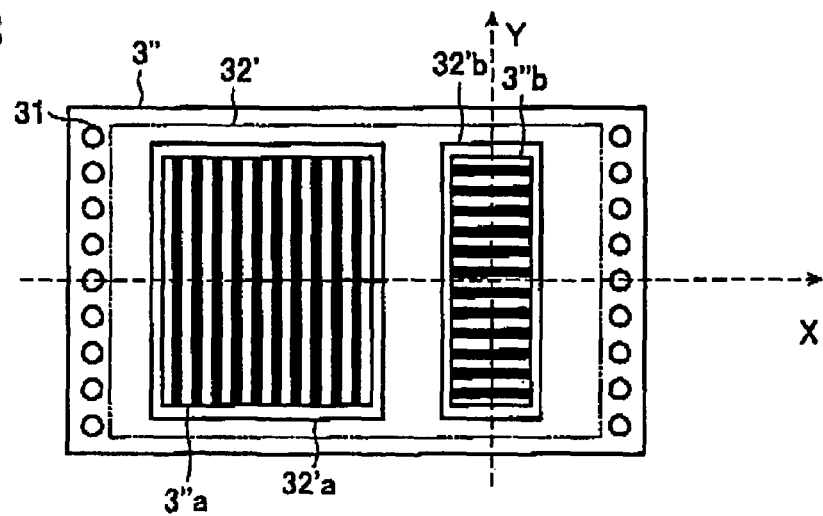
FIG. 13 is a schematic diagram that shows a photoreceiver of the photoelectric encoder according to the sixth embodiment of the present invention.

In the photoreceiver 3", as shown in FIG. 13, configurations of a light filter unit 32', a red light reception area 3"a and a blue light reception area 3"b are different from those of the second embodiment. Namely, in the light filter unit 32', a red light filter 32'a and a blue light filter 32'b are in series aligned in a relative movement direction. A light reception array of the blue light reception area 3"b is formed so as to be rotated at 90 degrees relative to the red light reception area 3"a. Here, an "X" direction is a scanning axis direction. A "Y" direction extends along a surface of the blue light reception area 3"b and is perpendicular to the X direction at a center of the blue light reception area 3"b.

Figure 14:
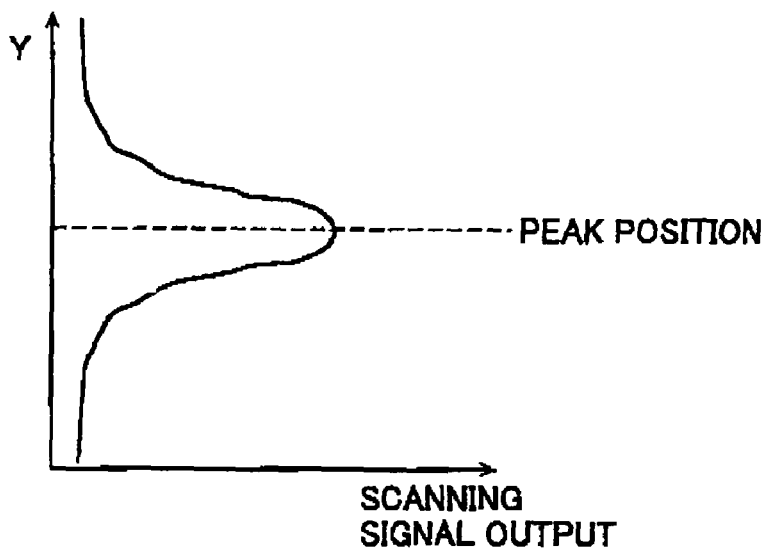
FIG. 14 is a diagram that shows an amount of light received in a blue light reception area in the case where the photoreceiver and the scale of the photoelectric encoder according to the sixth embodiment of the present invention are disposed in parallel.

For example, in the case where the photoreceiver 3" and the scale 2d are disposed in parallel with each other, an amount of light received on the blue light reception area 3"b always reaches a peak at "0" position in the Y direction as shown in FIG. 14.

Figure 15:
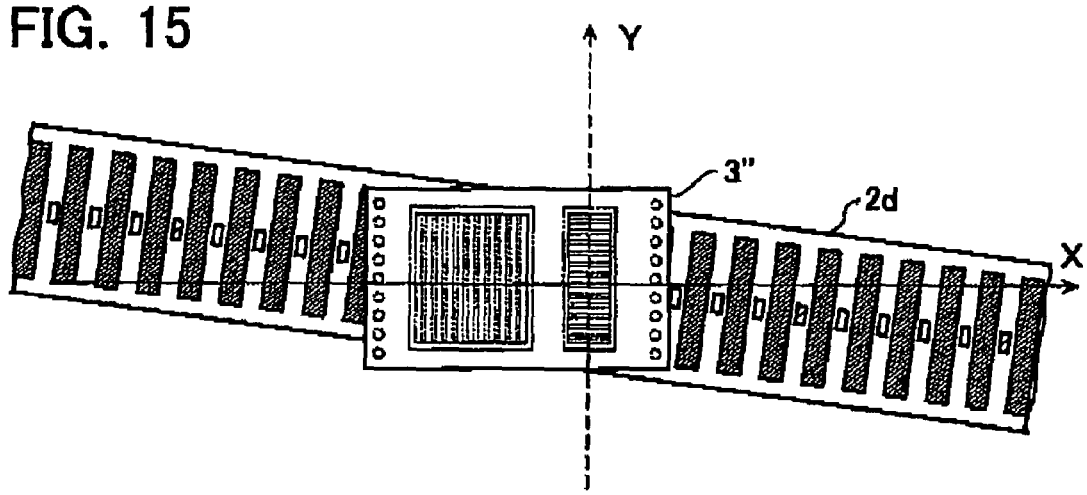
FIG. 15 is a diagram that shows the case where the scale is disposed so as to be inclined relative to the photoreceiver in the photoelectric encoder according to the sixth embodiment of the present invention.
Figure 16:
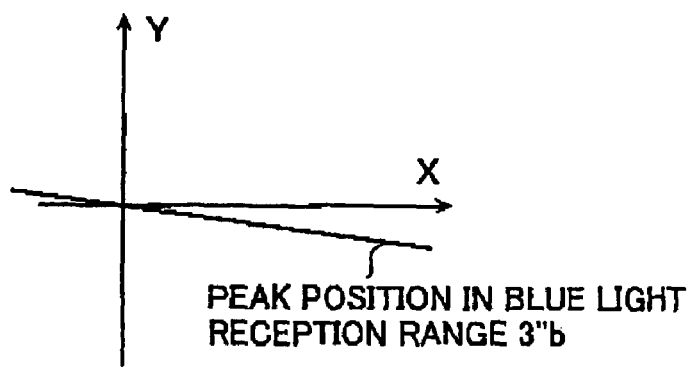
FIG. 16 is a graph that shows a relative movement amount of the scale and the amount of light received in the blue light reception area in the case where scanning is carried out in a state where the scale is disposed so as to be inclined relative to the photoreceiver in the photoelectric encoder according to the sixth embodiment of the present invention.

Further, for example, in the case where scanning is carried out in a state where the scale 2d is inclined relative to the photoreceiver 3' as shown in FIG. 15, a peak of the amount of light received on the blue light reception area 3"b becomes as shown in FIG. 16. Namely, the peak of the amount of light received on the blue light reception area 3"b is shifted in the Y direction with the relative movement of the photoreceiver 3" in the X direction.

Therefore, according to the configuration of the photoelectric encoder of the sixth embodiment, inclination between the photoreceiver 3" and the scale 3d can be detected. In addition, by configuring the photoelectric encoder of the sixth embodiment in this manner, the same effects of the first and second embodiments can also be achieved.

SEVENTH EMBODIMENT

Next, a photoelectric encoder according to a seventh embodiment of the present invention will be described with reference to FIGS. 17 and 18. In this regard, elements identical with those of the first and second embodiments are assigned to the same reference numerals of the first and second embodiments, and descriptions thereof are omitted.

The photoelectric encoder of the seventh embodiment includes a light source 1, a photoreceiver 3 and a control section 4 that are the same as those of the first embodiment. A scale 2e of the photoelectric encoder is different from that of the first embodiment.

Figure 17:
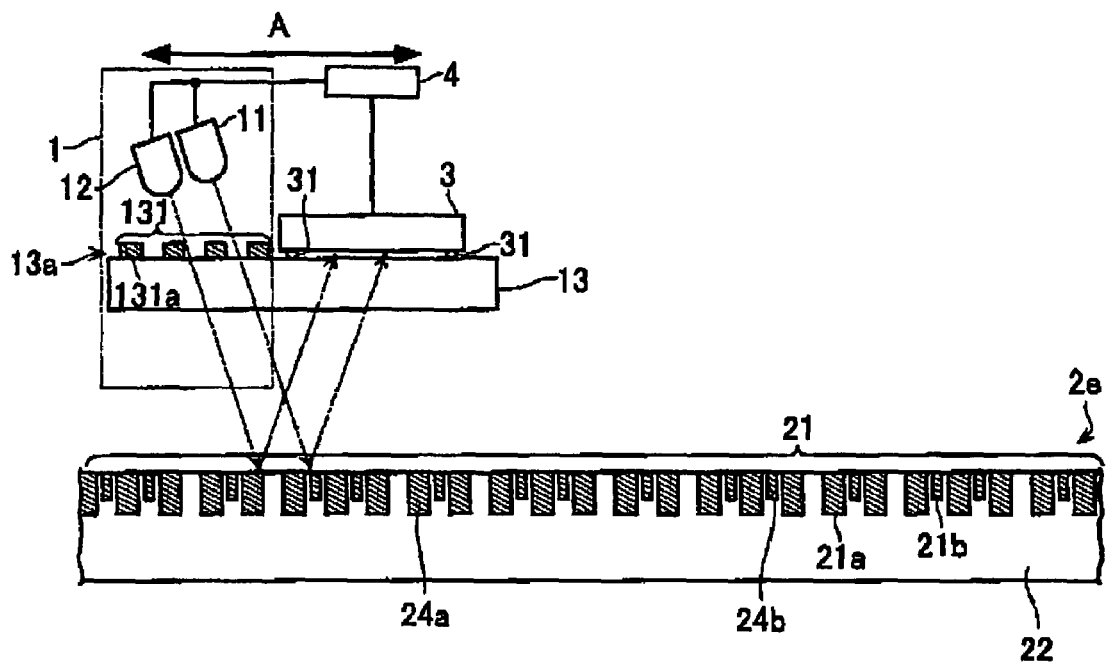
FIG. 17 is a schematic diagram that shows a configuration of a photoelectric encoder according to a seventh embodiment of the present invention.
Figure 18:
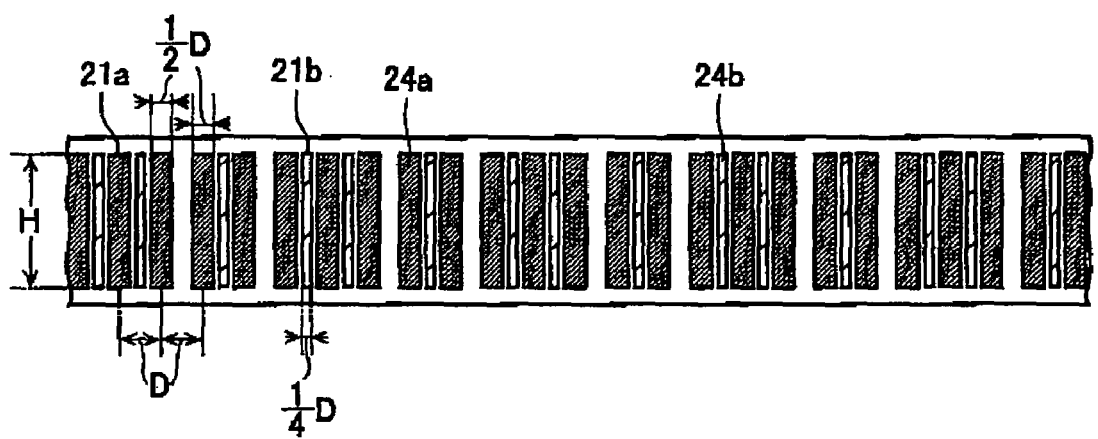
FIG. 18 is a top view of a scale of the photoelectric encoder according to the seventh embodiment of the present invention.

As shown in FIGS. 17 and 18, the scale 2e differs from the scale 2 of the first embodiment in that color resists 24a are embedded in the first reflection portions 21a each having a groove shape and color resists 24b are embedded in the second reflection portions 21b each having the groove shape. A wavelength of the light reflected or absorbed by the color resists 24a is different from that reflected or absorbed by the color resists 24b (for example, a wavelength of the red light and that of the blue light, or the like).

Here, the color resists 24a of the first reflection portions 21a form an incremental scale at 10/10 nm pitch intervals, for example. The color resists 24b of the second reflection portions 21b represent the absolute position. Further, a pseudorandom code pattern may be utilized as a representation technique of the absolute position, for example. A maximal length sequence (M-sequence) is preferable as the pseudorandom code pattern.

Moreover, according to the scale 2e of the seventh embodiment, an origin pattern can be formed by the color resists 24b of the second reflection portions 21b so that the photoelectric encoder has a scale with the origin. In this regard, a depth of each of the first reflection portions 21a may be set so as to match reflection (or absorption) efficiency of light for the color resists 24a. Likewise, a depth of each of the second reflection portions 21b may be set so as to match reflection (or absorption) efficiency of light for the color resists 24b.

By configuring the photoelectric encoder of the seventh embodiment in this manner, the same effects of the first and second embodiments can be achieved. In addition, since the scale 2e has a structure that the color resists 24a, 24b are respectively embedded in the first and second reflection portions 21a, 21b, an edge of data in reproduction can be sharpened so that a scale has high definition and high precision.

EIGHTH EMBODIMENT

Next, a photoelectric encoder according to an eighth embodiment of the present invention will be described with reference to FIGS. 19 and 20. In this regard, elements identical with those of the first and second embodiments are assigned to the same reference numerals of the first and second embodiments, and descriptions thereof are omitted.

The photoelectric encoder of the eighth embodiment includes a light source 1, a photoreceiver 3 and a control section 4 that are the same as those of the first embodiment. A scale 2f of the photoelectric encoder is different from that of the first embodiment.

Figure 19:
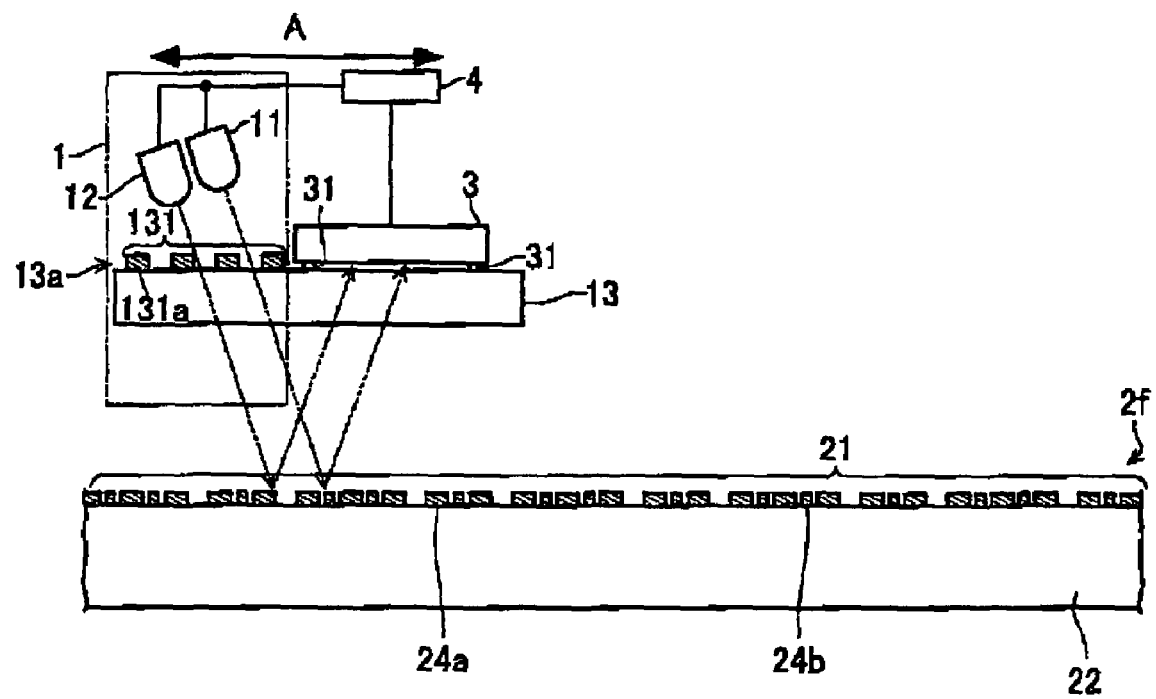
FIG. 19 is a schematic diagram that shows a configuration of a photoelectric encoder according to an eighth embodiment of the present invention.
Figure 20:
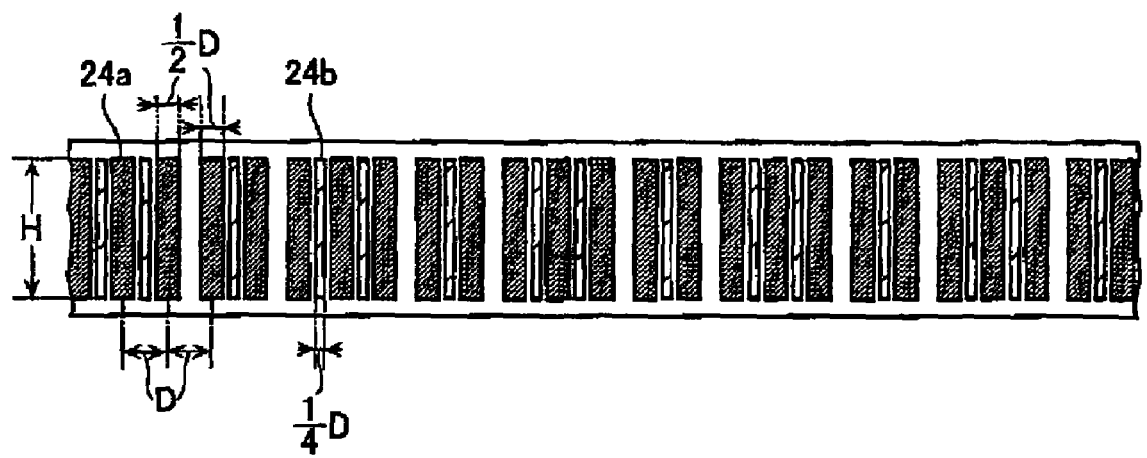
FIG. 20 is a top view of a scale of the photoelectric encoder according to the eighth embodiment of the present invention.

As shown in FIGS. 19 and 20, the scale 2f differs from the scale 2 of the first embodiment in that color resists 24a, 24b respectively functioning as the first and second reflection portions 21a, 21b are arranged on the substrate 22.

By configuring the photoelectric encoder of the eighth embodiment in this manner, the same effects of the first and second embodiments can be achieved. Further, since the scale 2f has a structure that the color resists 24a, 24b respectively functioning as the first and second reflection portions 21a, 21b are formed on the substrate 22, the scale 2f can be easily manufactured compared with the case where first and second reflection portions are formed so as to have a groove shape and the color resists 24a, 24b are then respectively embedded in the first and second reflection portions.

NINTH EMBODIMENT

Next, a photoelectric encoder according to a ninth embodiment of the present invention will be described with reference to FIGS. 21, 22A, 22B, 23A and 23B. In this regard, elements identical with those of the first and second embodiments are assigned to the same reference numerals of the first and second embodiments, and descriptions thereof are omitted.

The photoelectric encoder of the ninth embodiment includes a light source 1, a photoreceiver 3 and a control section 4 that are the same as those of the first embodiment. A scale 2g of the photoelectric encoder is different from that of the first embodiment.

Figure 21:
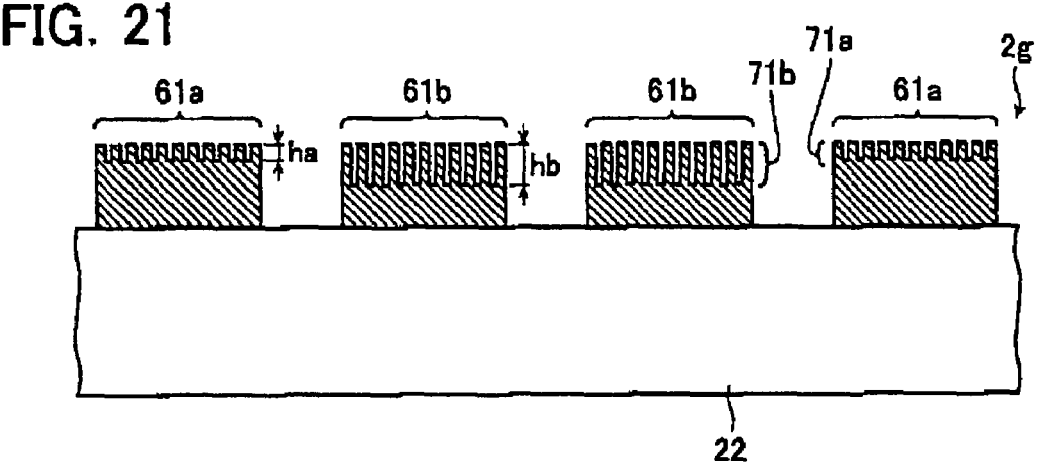
FIG. 21 is a side cross-sectional view that shows a part of a scale of a photoelectric encoder according to a ninth embodiment of the present invention.

As shown in FIG. 21, the scale 2g differs from the scale 2 of the first embodiment in that first reflection portions 61a and second reflection portions 61b are arranged on the substrate 22 and diffraction gratings 71a, 71b are respectively formed at incident plane sides of the first reflection portions 61a and the second reflection portions 61b. Each of the first reflection portions 61a and the second reflection portions 61b is formed of a thin chromium film. The diffraction gratings 71a each having a depth "ha" are aligned at same pitch intervals in each of the first reflection portions 61a. The diffraction grating 71b each having a depth "hb" different from the depth "ha" are aligned at same pitch intervals in each of the second reflection portions 61b.

Figure 22A:
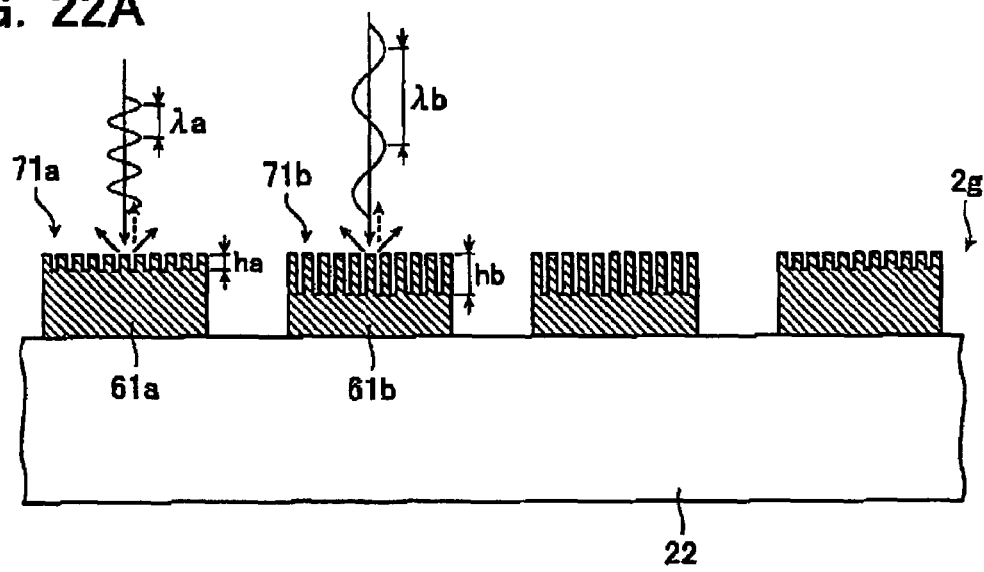
FIG. 22A is a side cross-sectional view that shows a part of the scale of the photoelectric encoder according to the ninth embodiment of the present invention.

As shown in FIG. 22A, when light with a wavelength "λa" (in this case, "λa"=4×"ha"), for example, reaches a surface of the first reflection portion 61a, each of the diffraction gratings 71a serves to diffract and reflect the light with the wavelength "λa" in a direction shown by an arrow of solid line in FIG. 22A and not to reflect the light in a direction opposite to an incidence direction of the light, shown by an arrow of dotted line in FIG. 22A. Likewise, when light with a wavelength "λb" ("λb"=4×"hb"), for example, reaches a surface of the second reflection portion 61b, each of the diffraction gratings 71b serves to diffract and reflect the light with the wavelength "λb" in a direction shown by an arrow of solid line in FIG. 22A and not to reflect the light in an direction opposite to an incidence direction of the light, shown by an arrow of dotted line in FIG. 22A.

Figure 22B:
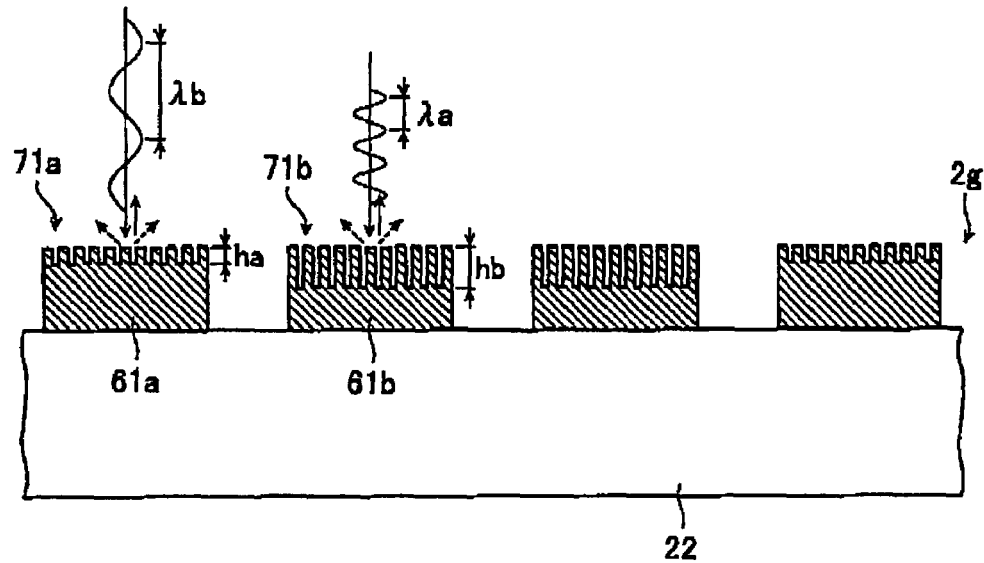
FIG. 22B is a side cross-sectional view that shows a part of the scale of the photoelectric encoder according to the ninth embodiment of the present invention.

On the other hand, as shown in FIG. 22B, when the light with the wavelength "λb" reaches the surface of the first reflection portion 61a, diffraction light may be weakened due to mismatch of a condition of diffraction, thereby the light is reflected in the direction shown by an arrow of solid line in FIG. 22B. Likewise, when the light with the wavelength "λa" reaches the surface of the second reflection portion 61b, diffraction light may be weakened due to mismatch of a condition of diffraction, thereby the light is reflected in the direction shown by an arrow of solid line in FIG. 22B.

Figure 23A:
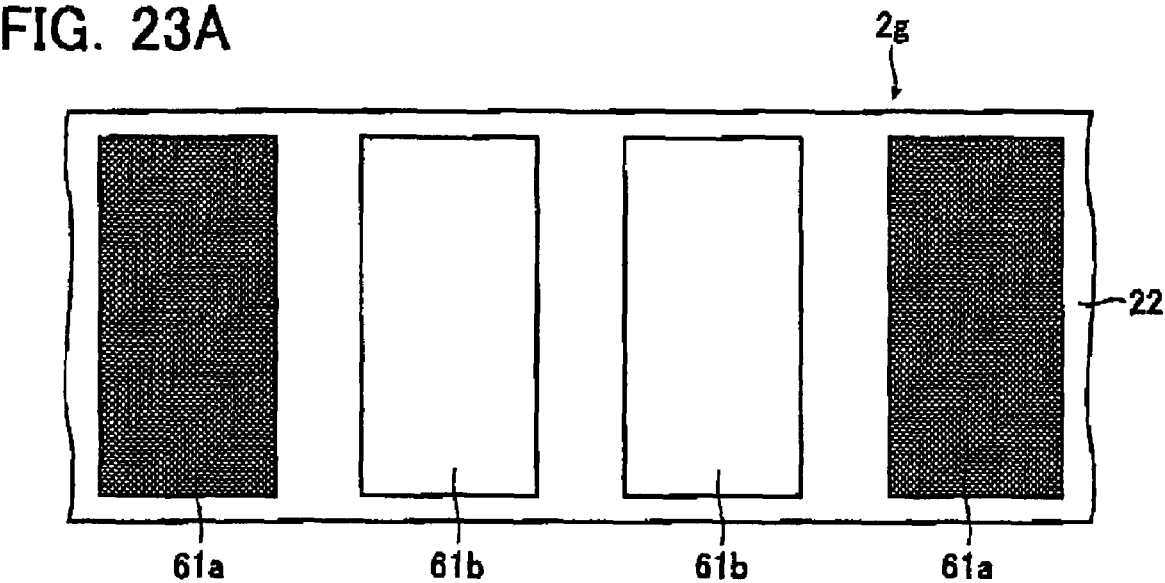
FIG. 23A is a top view that shows a part of the scale of the photoelectric encoder according to the ninth embodiment of the present invention.
Figure 23B:
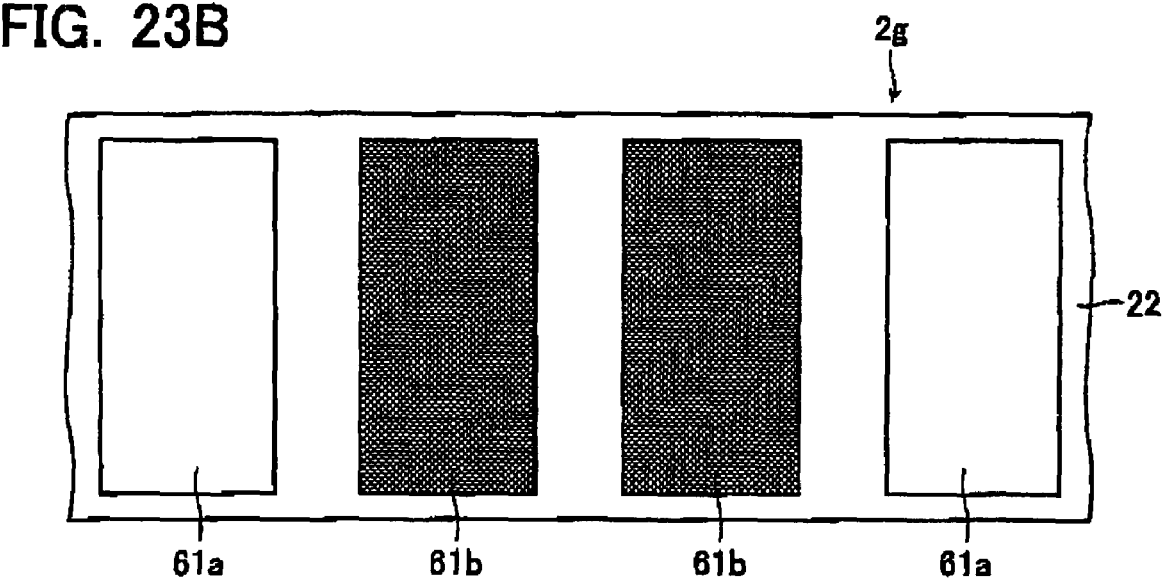
FIG. 23B is a top view that shows a part of the scale of the photoelectric encoder according to the ninth embodiment of the present invention.

Namely, when the scale 2g having the structure described above is measured using the light with the wavelength "λa", the first reflection portions 61a cannot be detected and the second reflection portions 61b can be detected as shown in FIG. 23A. On the other hand, when the scale 2g is measured using the light with the wavelength "λb", the first reflection portions 61a can be detected and the second reflection portions 61b cannot be detected as shown in FIG. 23B.

By configuring the photoelectric encoder of the ninth embodiment in this manner, the same effects of the first and second embodiments can be achieved. In addition, since the scale 2g has a structure that the first reflection portions 61a each having the diffraction grating 71a and the second reflection portions 61b each having the diffraction grating 71b are formed on the substrate 22, the scale 2g can be easily manufactured compared with the case where the first and second reflection portions are formed in a substrate so as to have a groove shape.

<First Method of Manufacturing a Scale>

Figure 24A:
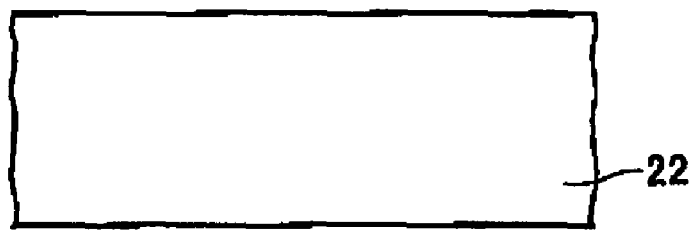
FIG. 24A is a diagram that shows a first method of manufacturing a scale of a photoelectric encoder of the present invention.
Figure 24B:
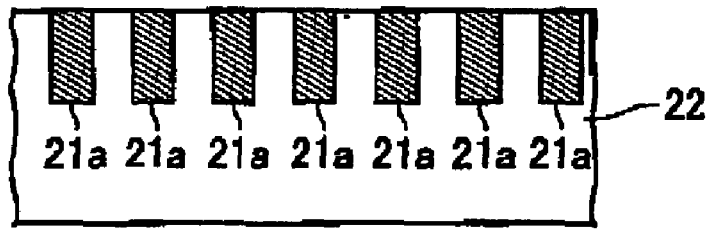
FIG. 24B is a diagram that shows the first method of manufacturing the scale of the photoelectric encoder of the present invention.
Figure 24C:
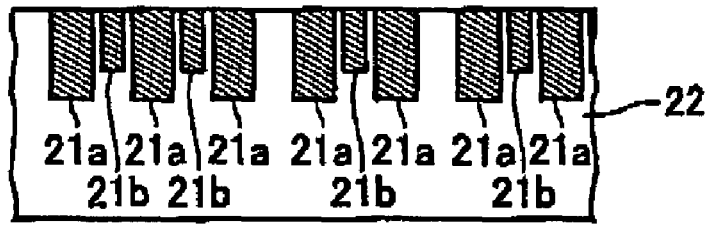
FIG. 24C is a diagram that shows the first method of manufacturing the scale of the photoelectric encoder of the present invention.
Figure 24D:
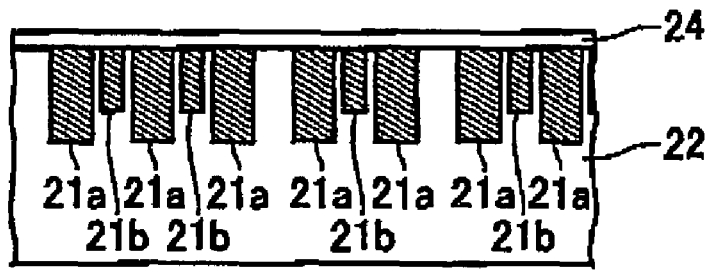
FIG. 24D is a diagram that shows the first method of manufacturing the scale of the photoelectric encoder of the present invention.

Next, a first method of manufacturing a scale 2 will now be described with reference to FIGS. 24A to 24D. As shown in FIG. 24A, a substrate 22 is first prepared. As described above, the substrate 22 is a plate made of a stainless steel material. Subsequently, irradiation of a laser (for example, an yttrium orthovanadate (YVO4) laser) with a first output is carried out at predetermined pitch intervals so that a surface of the substrate 22 is oxidized, whereby first reflection portions 21a are formed with an oxidized film as shown in FIG. 24B. Subsequently, irradiation of a laser with a second output smaller than the first output is carried out so that the surface of the substrate 22 is oxidized, whereby the second reflection portions 21b are formed with an oxidized film as shown in FIG. 24C. A transparent material is then formed on the surface of the substrate 22 and surfaces of the first and second reflection portions 21a, 21b to manufacture the scale 2 as shown in FIG. 24D. In this regard, the substrate 22 may be a plate made of titanium other than the plate made of a stainless steel material.

According to the first method of manufacturing the scale 2, the first reflection portions 21a and the second reflection portions 21b can be formed by mainly irradiating the laser having different outputs to the substrate 22. Therefore, the scale 2 for a photoelectric encoder with high precision can be manufactured at a low cost. In addition, since the transparent material 24 is formed on the surfaces of the substrate 22, the first reflection portions 21a and the second reflection portions 21b, corrosion resistance of the first and second reflection portions 21a, 21b can be enhanced.

<Second Method of Manufacturing a Scale>

Figure 25A:
FIG. 25A is a diagram that shows a second method of manufacturing a scale of a photoelectric encoder of the present invention.
Figure 25B:
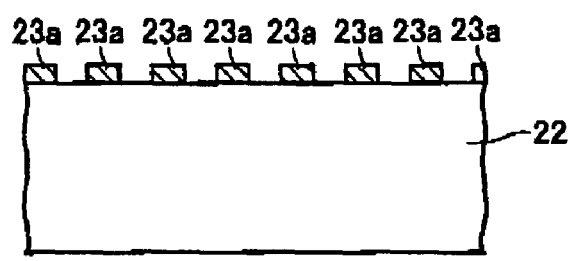
FIG. 25B is a diagram that shows the second method of manufacturing the scale of the photoelectric encoder of the present invention.
Figure 25C:
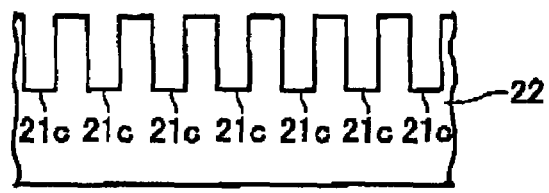
FIG. 25C is a diagram that shows the second method of manufacturing the scale of the photoelectric encoder of the present invention.
Figure 25D:
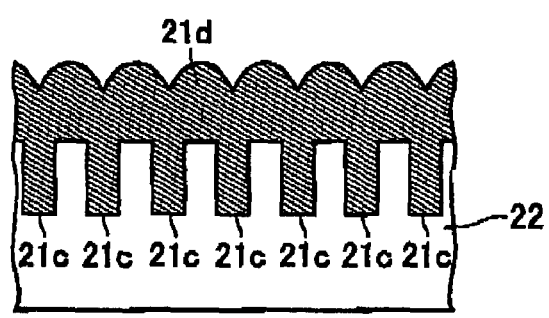
FIG. 25D is a diagram that shows the second method of manufacturing the scale of the photoelectric encoder of the present invention.
Figure 25E:
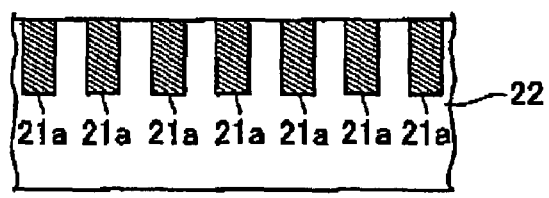
FIG. 25E is a diagram that shows the second method of manufacturing the scale of the photoelectric encoder of the present invention.

A second method of manufacturing a scale 2 will be described with reference to FIGS. 25A to 25E and 26A to 26B. As shown in FIG. 25A, a substrate 22 is first prepared. Subsequently, resists 23a are applied to (or formed on) a surface of the substrate 22 in a first pattern as shown in FIG. 25B. Subsequently, exposure to the substrate 22 is carried out to etch the substrate 22. The resists 23a are then removed from the substrate 22 so that first grooves 21c are formed in the substrate 22 as shown in FIG. 25C. Transparent material 21d is deposited on the substrate 22 by a vapor deposition as shown in FIG. 25D. Subsequently, the substrate 22 is subjected to a chemical mechanical polishing (CMP) process so that the first reflection portions 21a are formed in the substrate 22 as shown in FIG. 25E.

Figure 26A:
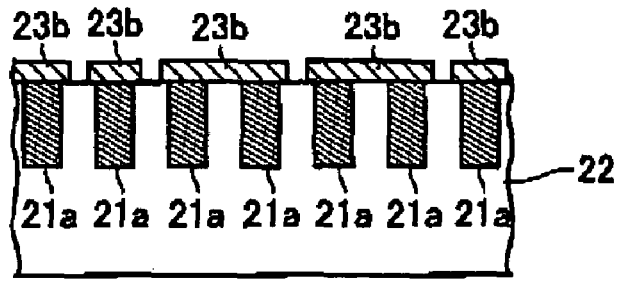
FIG. 26A is a diagram that shows the second method of manufacturing the scale of the photoelectric encoder of the present invention.
Figure 26B:
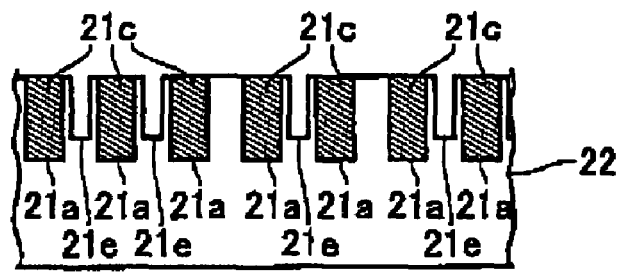
FIG. 26B is a diagram that shows the second method of manufacturing the scale of the photoelectric encoder of the present invention.
Figure 26C:
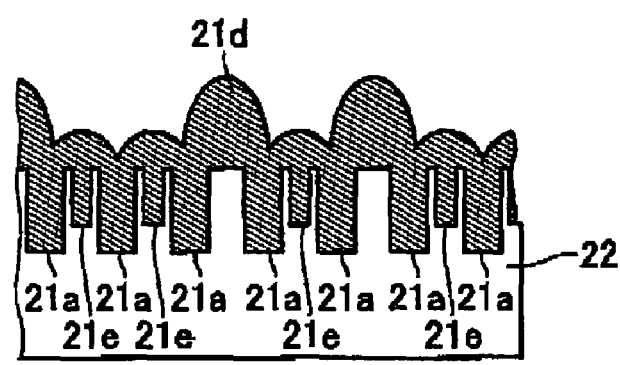
FIG. 26C is a diagram that shows the second method of manufacturing the scale of the photoelectric encoder of the present invention.
Figure 26D:
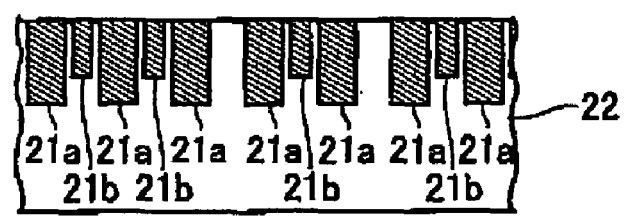
FIG. 26D is a diagram that shows the second method of manufacturing the scale of the photoelectric encoder of the present invention.

Subsequently, resists 23b are formed on the surface of the substrate 22 in a second pattern as shown in FIG. 26A. Subsequently, exposure to the substrate 22 is carried out to etch the substrate 22. The resists 23b are then removed from the substrate 22 so that second grooves 21e are formed in the substrate 22 as shown in FIG. 26B. Transparent material 21d is deposited on the substrate 22 by the vapor deposition as shown in FIG. 26C. The substrate 22 is subjected to a CMP process so that the second reflection portions 21b are formed in the substrate 22 as shown in FIG. 26D. Thus, the scale 2 is manufactured.

According to the second method of manufacturing the scale 2, the first and second reflection portions 21a, 21b can be formed by mainly carrying out a step of forming the first and second grooves 21c, 21e by means of etching so that each of the first grooves 21c has a depth different from that of each of the second grooves 21e. Therefore, the scale 2 for a photoelectric encoder with high precision can be manufactured at a low cost.

<Third Method of Manufacturing a Scale>

Figure 27A:
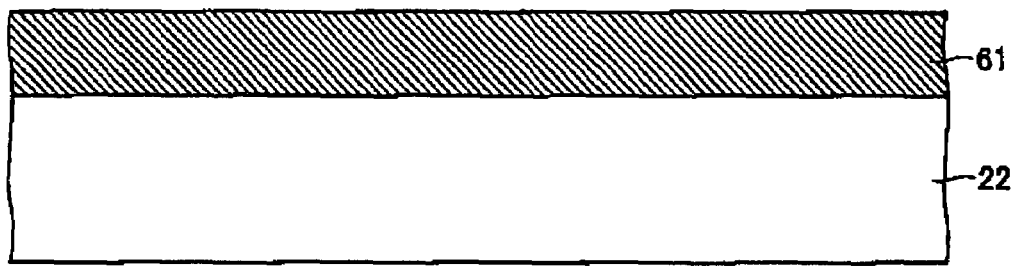
FIG. 27A is a diagram that shows a third method of manufacturing a scale of a photoelectric encoder of the present invention.
Figure 27B:
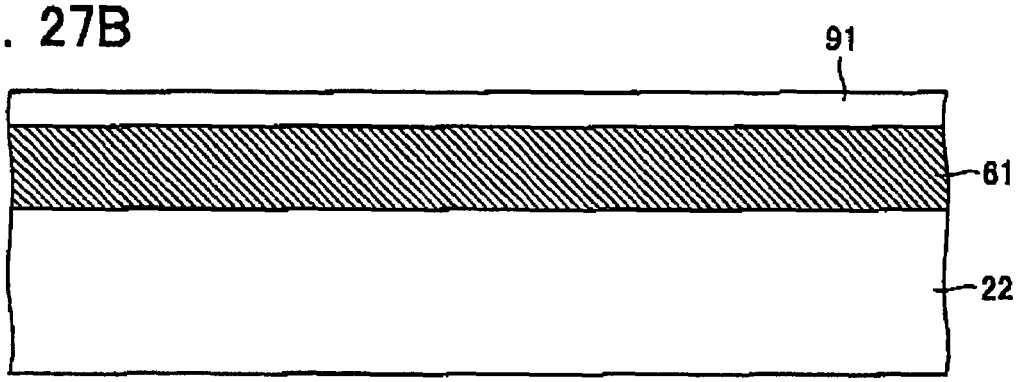
FIG. 27B is a diagram that shows the third method of manufacturing the scale of the photoelectric encoder of the present invention.
Figure 27C:
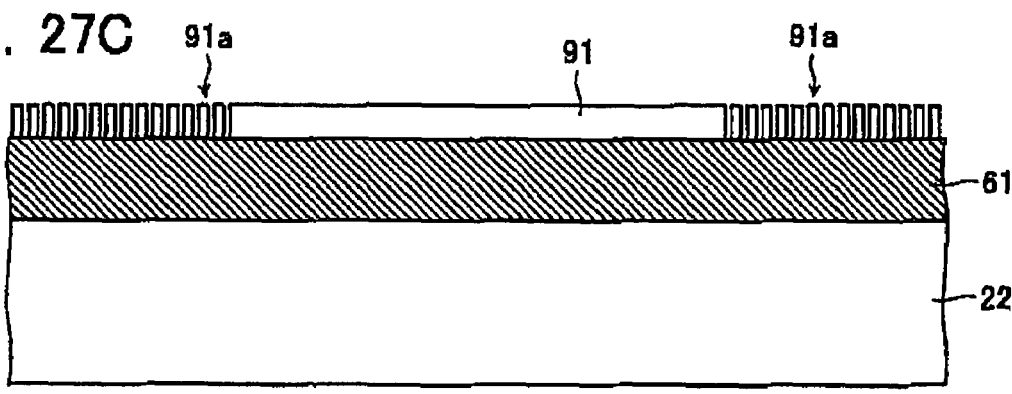
FIG. 27C is a diagram that shows the third method of manufacturing the scale of the photoelectric encoder of the present invention.
Figure 27D:
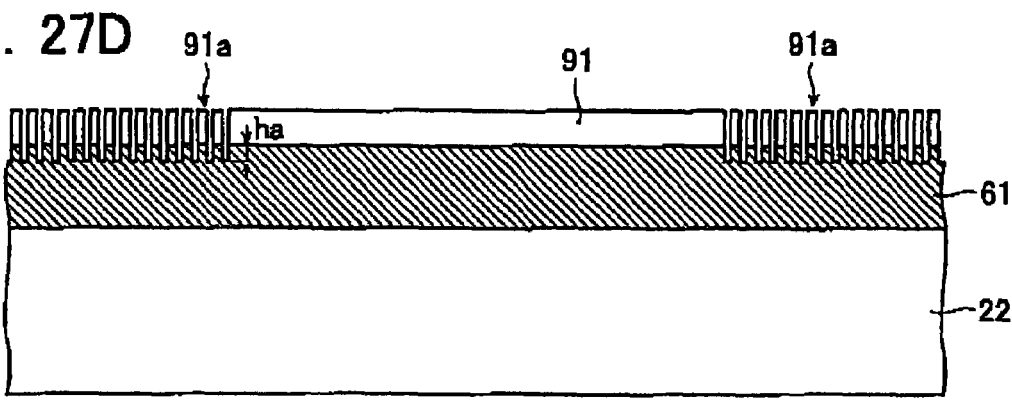
FIG. 27D is a diagram that shows the third method of manufacturing the scale of the photoelectric encoder of the present invention.

A third method of manufacturing a scale 2 will be described with reference to FIGS. 27A to 27M. Here, the case where a scale 2g is specifically manufactured as the scale 2 will be described. A substrate 22 is first prepared, and a thin chromium film 61 as light reflection portions is formed on the substrate 22 as shown in FIG. 27A. Subsequently, a resist 91 is applied to a surface of the thin chromium film 61 as shown in FIG. 27B. Subsequently, patterns 91a are formed in predetermined regions of the resist 91 for etching the thin chromium film 61 to a depth "ha" as shown in FIG. 27C. The predetermined regions include regions for formation of diffraction gratings 71a of first reflection portions 61a. In accordance with the patterns 91a, the thin chromium film 61 is etched to the depth "ha" as shown in FIG. 27D.

Figure 27E:
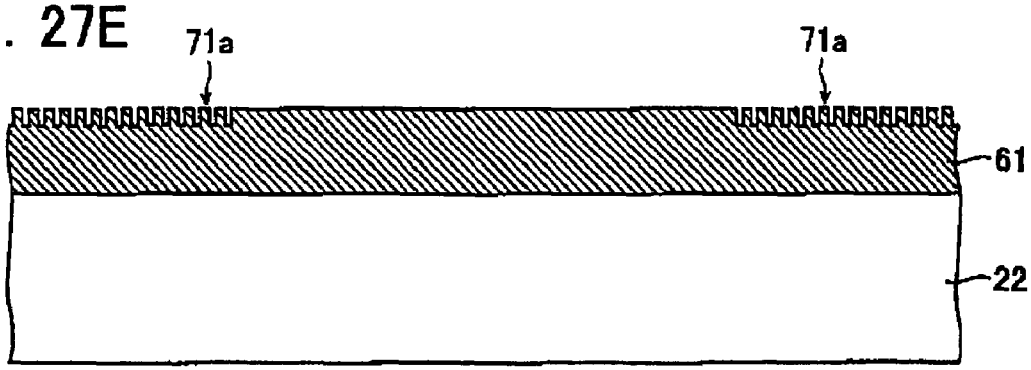
FIG. 27E is a diagram that shows the third method of manufacturing the scale of the photoelectric encoder of the present invention.
Figure 27F:
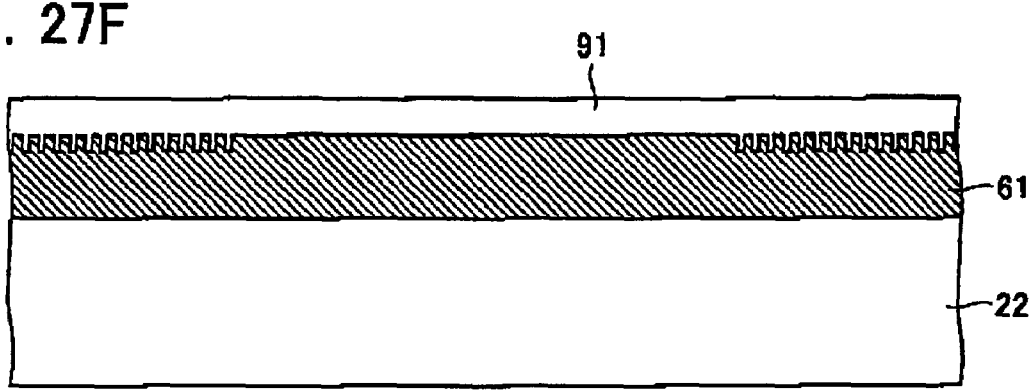
FIG. 27F is a diagram that shows the third method of manufacturing the scale of the photoelectric encoder of the present invention.
Figure 27G:
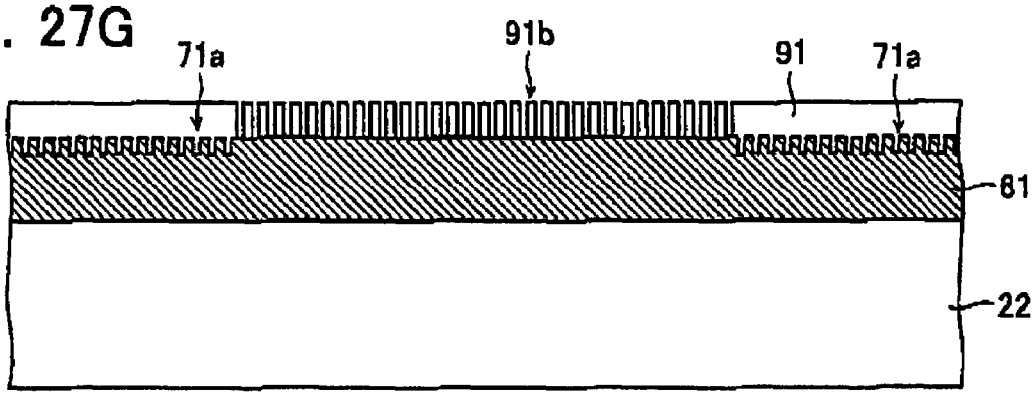
FIG. 27G is a diagram that shows the third method of manufacturing the scale of the photoelectric encoder of the present invention.
Figure 27H:
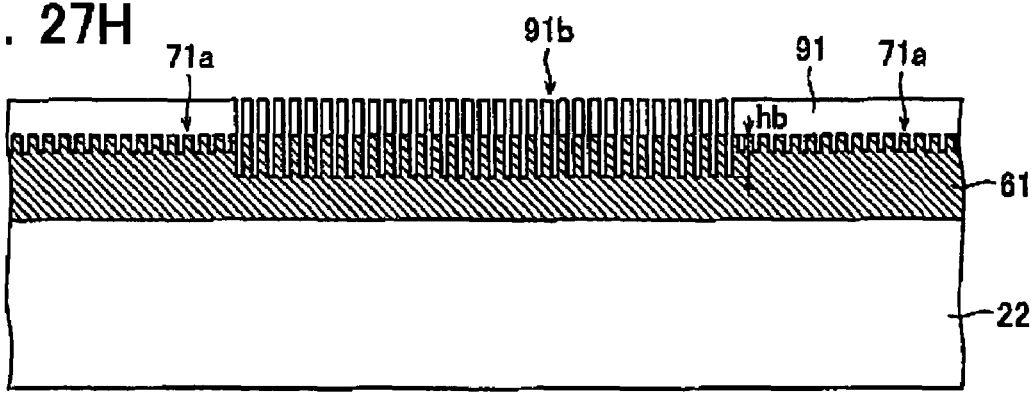
FIG. 27H is a diagram that shows the third method of manufacturing the scale of the photoelectric encoder of the present invention.

The resist 91 including the patterns 91a is removed from the surface of the thin chromium film 61 so that the diffraction gratings 71a are formed as shown in FIG. 27E. A resist 91 is then applied to the surface of the thin chromium film 61 again as shown in FIG. 27F. Patterns 91b are formed in predetermined regions of the resist 91 for etching the thin chromium film 61 to a depth "hb" as shown in FIG. 27G. The predetermined regions include regions for formation of diffraction gratings 71b of the second reflection portions 61b. In accordance with the patterns 91b, the thin chromium film 61 is etched to a depth "hb" as shown in FIG. 27H.

Figure 27I:
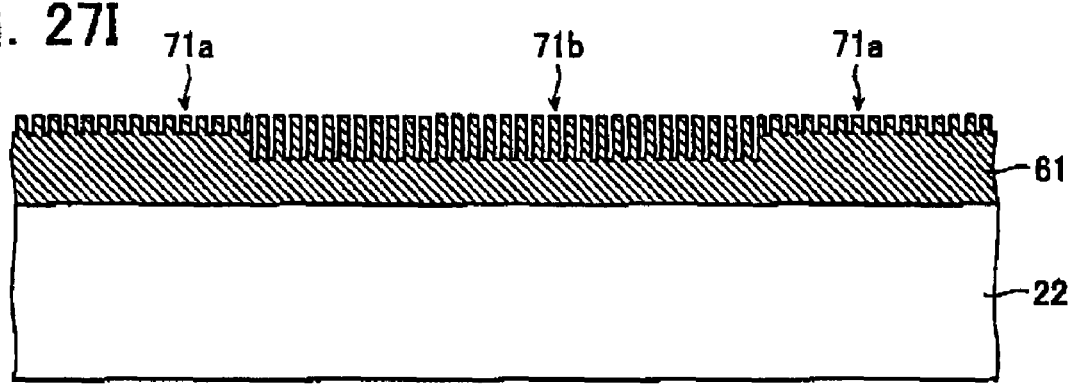
FIG. 27I is a diagram that shows the third method of manufacturing the scale of the photoelectric encoder of the present invention.
Figure 27J:
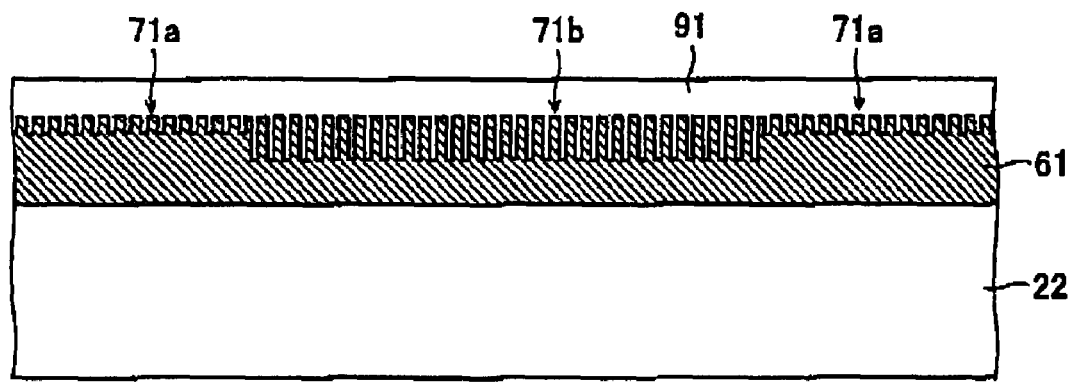
FIG. 27J is a diagram that shows the third method of manufacturing the scale of the photoelectric encoder of the present invention.
Figure 27K:
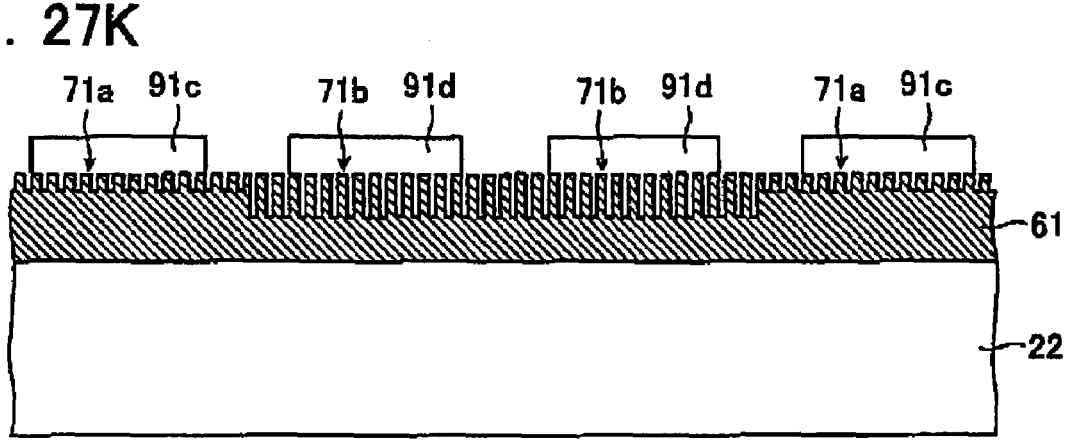
FIG. 27K is a diagram that shows the third method of manufacturing the scale of the photoelectric encoder of the present invention.
Figure 27L:
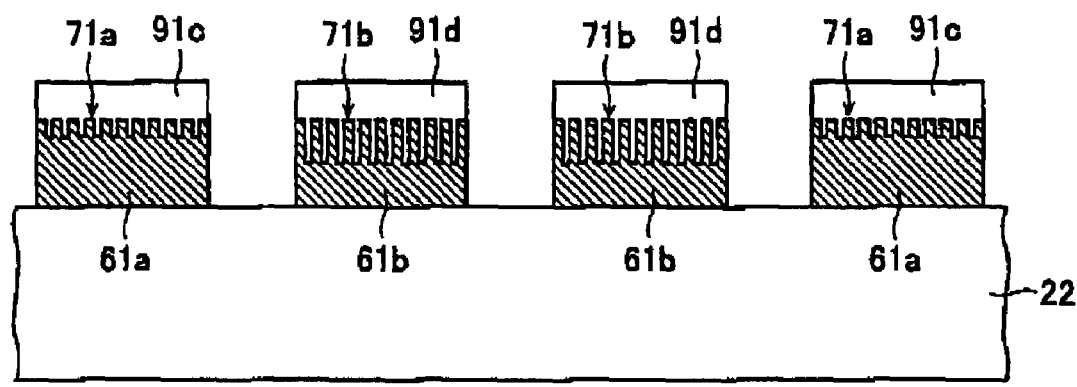
FIG. 27L is a diagram that shows the third method of manufacturing the scale of the photoelectric encoder of the present invention.
Figure 27M:
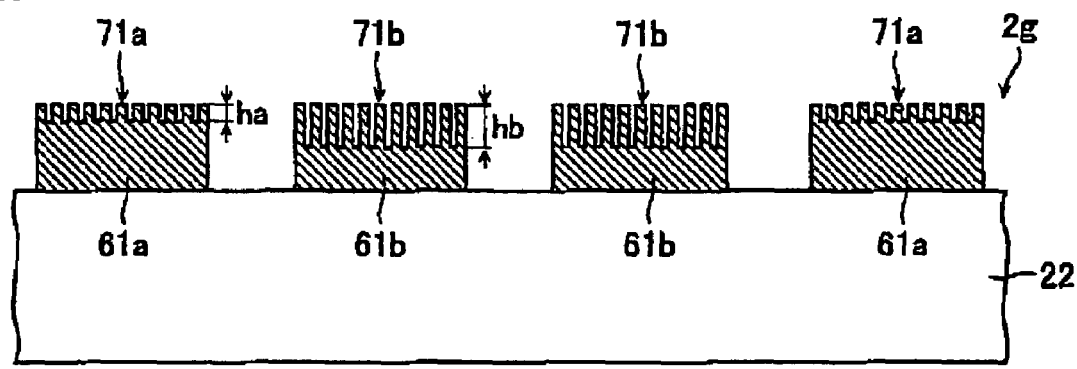
FIG. 27M is a diagram that shows the third method of manufacturing the scale of the photoelectric encoder of the present invention.

Subsequently, the resist 91 including the patterns 91b is removed from the surface of the thin chromium film 61 so that the diffraction gratings 71b are formed as shown in FIG. 27I. A resist 91 is further applied to the surface of the thin chromium film 61 as shown in FIG. 27J. Patterns 91c, 91d are formed in the resist 91 for formation of the first reflection portions 61a and the second reflection portions 61b as shown in FIG. 27K. The thin chromium film 61 is then etched in accordance with the patterns 91c, 91d as shown in FIG. 27L. The resists 91 are removed as shown in FIG. 27M. Thus, the scale 2g with which the first reflection portions 61a each having the diffraction grating 71a and the second reflection portions 61b each having the diffraction gratings 71b are provided is manufactured.

According to the third method of manufacturing the scale 2, the first and second reflection portions 61a, 61b can be formed by mainly carrying out a step of forming the diffraction gratins 71a, 71b by means of etching so that each of the diffraction gratings 71a has a depth different from that of each of the diffraction gratings 71b. Therefore, the scale 2 for a photoelectric encoder with high precision can be manufactured at a low cost.

As described above, according to the photoelectric encoder of the present invention, a scale incorporated in the photoelectric encoder as an element, and a method of manufacturing the scale of the photoelectric encoder of the present invention, the light source emits the light with different wavelengths to the scale and the scale includes a plurality of reflection portions that reflect the light with the different wavelengths respectively. Thus, light with one of the different wavelengths is reflected by one of the plurality of reflection portions. Therefore, the amount of information can be increased in accordance with the number of the different wavelengths of light reflected by the scale. The increase in the amount of information results in a photoelectric encoder with high precision. Such a photoelectric encoder can be manufactured at a low cost.

What is claimed is:

1. A photoelectric encoder comprising:
   a scale having a phase grating formed thereon along a measuring axis;
   a light source operative to emit light to the scale so as to form a light spot on the phase grating; and
   a photoreceiver operative to receive reflected light from the scale,
   wherein the light source and the photoreceiver are disposed so as to be allowed to move relative to the scale at least in a direction along the measuring axis,
   wherein the light source emits the light to the scale so that the photoreceiver receives the reflected light by the scale,
   wherein the light source emits light with different wavelengths,
   wherein the phase grating includes a plurality of reflection portions that respectively reflect the light with different wavelengths, the reflection portions being disposed on a single line along the measuring axis, and
   wherein the plurality of reflection portions are made of a plurality of color resists, and each of the plurality of color resists reflects or absorbs the light with one of the different wavelengths,
   the plurality of reflection portions respectively having different depths from a surface of the scale so that each of the plurality of reflection portions reflects the light with one of the different wavelengths in accordance with the depth thereof, and
   a depth of each of the reflection portions is set as to match reflection or absorption efficiency of light for one of the color resists formed therein.

2. The photoelectric encoder according to claim 1, wherein in the plurality of reflection portions, diffraction gratings are respectively formed in incidence planes thereof, and each of the diffraction gratings diffracts light with a predetermined wavelength.

3. The photoelectric encoder according to claim 1, wherein the light source selectively emits light with at least two wavelengths.

4. The photoelectric encoder according to claim 1, further comprising:
   a wavelength separator operative to separate the reflected light received by the photoreceiver on the basis of each of the different wavelengths,
   wherein the light source emits light with a predetermined wavelength range.

5. A scale operative to reflect light emitted by a light source, the scale being allowed to move relative to the light source and a photoreceiver that are incorporated in a photoelectric encoder, wherein the scale includes a phase grating comprising a plurality of reflection portions each of which reflects light with one of different wavelengths, the reflection portions being disposed on a single line along a measuring axis of said scale,
   wherein the plurality of reflection portions are made of a plurality of color resists, and each of the plurality of color resists reflects or absorbs the light with one of the different wavelengths,
   the plurality of reflection portions respectively having different depths from a surface of the scale so that each of the plurality of reflection portions reflects the light with one of the different wavelengths in accordance with the depth thereof, and
   a depth of each of the reflection portions is set as to match reflection or absorption efficiency of light for one of the color resists formed therein.

6. The scale according to claim 5, wherein in the plurality of reflection portions, diffraction gratings are respectively formed in incidence planes thereof, and each of the diffraction gratings diffracts light with a predetermined wavelength.

7. A method of manufacturing a scale for configuration of a photoelectric encoder, the method comprising:
   preparing a substrate; and
   forming a phase grating comprising a plurality of reflection portions in a surface of the substrate at predetermined pitch intervals, the plurality of reflection portions respectively reflecting light with different wavelengths,
   wherein the forming the plurality of reflection portions includes forming the plurality of reflection portions respectively having different depths from a surface of the substrate in the surface of the substrate at the predetermined pitch intervals on a single line along a measuring axis of the scale, and one of the plurality of reflection portions reflects light with one of different wavelengths in accordance with the depth thereof, wherein the plurality of reflection portions are made of a plurality of color resists and each of the plurality of color resists reflects or absorbs the light with one of the different wavelengths, and a depth of each of the reflection portions is set as to match reflection or absorption efficiency of light for one of the color resists formed therein.

8. The method according to claim 7, wherein the forming the plurality of reflection portions includes irradiating lasers respectively having different outputs to the substrate to oxidize the substrate so that each of the plurality of reflection portions has one of the different depths.

9. The method according to claim 7, further comprising:
after forming the plurality of reflection portions, forming a transparent material on surfaces of the plurality of reflection portions and the surface of the substrate.

* * * * *